(12) United States Patent
Mohageg et al.

(10) Patent No.: US 8,564,869 B1
(45) Date of Patent: Oct. 22, 2013

(54) VOLTAGE CONTROLLED TUNABLE SINGLE SIDEBAND MODULATORS AND DEVICES BASED ON ELECTRO-OPTIC OPTICAL WHISPERING GALLERY MODE RESONATORS

(75) Inventors: Makan Mohageg, Granada Hills, CA (US); Andrey B. Matsko, Pasadena, CA (US); Anatoliy Savchenkov, Glendale, CA (US); Vladimir S. Ilchenko, Arcadia, CA (US); David Seidel, Alta Loma, CA (US); Lute Maleki, Pasadena, CA (US)

(73) Assignee: OEwaves, Inc., Pasadena, CA (US)

( * ) Notice: Subject to any disclaimer, the term of this patent is extended or adjusted under 35 U.S.C. 154(b) by 225 days.

(21) Appl. No.: 13/184,447

(22) Filed: Jul. 15, 2011

Related U.S. Application Data

(60) Provisional application No. 61/364,761, filed on Jul. 15, 2010.

(51) Int. Cl.
G02F 1/03 (2006.01)
G02F 1/23 (2006.01)

(52) U.S. Cl.
USPC .......................... 359/245; 359/278; 359/900

(58) Field of Classification Search
USPC ................ 359/238, 239, 245, 254, 278, 900
See application file for complete search history.

(56) References Cited

U.S. PATENT DOCUMENTS

| | | | |
|---|---|---|---|
| 5,204,640 A | 4/1993 | Logan, Jr. | |
| 5,220,292 A | 6/1993 | Bianchini et al. | |
| 5,723,856 A | 3/1998 | Yao et al. | |
| 5,751,747 A | 5/1998 | Lutes et al. | |
| 5,777,778 A | 7/1998 | Yao | |
| 5,917,179 A | 6/1999 | Yao | |
| 5,929,430 A | 7/1999 | Yao et al. | |
| 5,985,166 A | 11/1999 | Unger et al. | |
| 6,080,586 A | 6/2000 | Baldeschwieler et al. | |
| 6,178,036 B1 | 1/2001 | Yao | |
| 6,203,660 B1 | 3/2001 | Unger et al. | |
| 6,389,197 B1 | 5/2002 | Iltchenko et al. | |
| 6,417,957 B1 | 7/2002 | Yao | |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 | 12/2002 | Iltchenko et al. | |
| 6,490,039 B2 | 12/2002 | Maleki et al. | |

(Continued)

FOREIGN PATENT DOCUMENTS

WO WO-01/96936 A1 12/2001
WO WO-2005/038513 A2 4/2005

(Continued)

OTHER PUBLICATIONS

Braginsky, V.B., et al., "Quality-Factor and Nonlinear Properties of Optical Whispering-Gallery Modes," *Physics Letters A*, 137(7, 8):393-397, May 1989.

(Continued)

Primary Examiner — Jack Dinh
(74) Attorney, Agent, or Firm — Perkins Coie LLP

(57) ABSTRACT

Photonic devices and techniques based on tunable single sideband (SSB) modulation in whispering gallery mode resonators formed of different poled electro-optic domains and to support whispering gallery modes circulating in the optical resonator to effectuate a single sideband (SSB) on only one side of the laser frequency without having a mirror image sideband on the other side of the laser frequency.

16 Claims, 16 Drawing Sheets

(56) References Cited

U.S. PATENT DOCUMENTS

| | | |
|---|---|---|
| 6,535,328 B2 | 3/2003 | Yao |
| 6,567,436 B1 | 5/2003 | Yao et al. |
| 6,580,532 B1 | 6/2003 | Yao et al. |
| 6,594,061 B2 | 7/2003 | Huang et al. |
| 6,762,869 B2 | 7/2004 | Maleki et al. |
| 6,795,481 B2 | 9/2004 | Maleki et al. |
| 6,798,947 B2 | 9/2004 | Iltchenko |
| 6,853,479 B1 | 2/2005 | Ilchenko et al. |
| 6,871,025 B2 | 3/2005 | Maleki et al. |
| 6,873,631 B2 | 3/2005 | Yao et al. |
| 6,879,752 B1 | 4/2005 | Ilchenko et al. |
| 6,901,189 B1 | 5/2005 | Savchenkov et al. |
| 6,906,309 B2 | 6/2005 | Sayyah et al. |
| 6,922,497 B1 | 7/2005 | Savchenkov et al. |
| 6,928,091 B1 | 8/2005 | Maleki et al. |
| 6,943,934 B1 | 9/2005 | Ilchenko et al. |
| 6,987,914 B2 | 1/2006 | Savchenkov et al. |
| 7,024,069 B2 | 4/2006 | Savchenkov et al. |
| 7,043,117 B2 | 5/2006 | Matsko et al. |
| 7,050,212 B2 | 5/2006 | Matsko et al. |
| 7,061,335 B2 | 6/2006 | Maleki et al. |
| 7,062,131 B2 | 6/2006 | Ilchenko |
| 7,092,591 B2 | 8/2006 | Savchenkov et al. |
| 7,133,180 B2 | 11/2006 | Ilchenko et al. |
| 7,173,749 B2 | 2/2007 | Maleki et al. |
| 7,184,451 B2 | 2/2007 | Ilchenko et al. |
| 7,187,870 B2 | 3/2007 | Ilchenko et al. |
| 7,218,662 B1 | 5/2007 | Ilchenko et al. |
| 7,248,763 B1 | 7/2007 | Kossakovski et al. |
| 7,260,279 B2 | 8/2007 | Gunn et al. |
| 7,283,707 B1 | 10/2007 | Maleki et al. |
| 7,356,214 B2 | 4/2008 | Ilchenko |
| 7,362,927 B1 | 4/2008 | Ilchenko et al. |
| 7,369,722 B2 | 5/2008 | Yilmaz et al. |
| 7,389,053 B1 | 6/2008 | Ilchenko et al. |
| 7,400,796 B1 | 7/2008 | Kossakovski et al. |
| 7,440,651 B1 | 10/2008 | Savchenkov et al. |
| 7,460,746 B2 | 12/2008 | Maleki et al. |
| 7,480,425 B2 | 1/2009 | Gunn et al. |
| 7,587,144 B2 | 9/2009 | Ilchenko et al. |
| 7,630,417 B1 | 12/2009 | Maleki et al. |
| 7,634,201 B2 | 12/2009 | Maleki et al. |
| 7,801,189 B2 | 9/2010 | Maleki et al. |
| 7,813,651 B2 | 10/2010 | Ilchenko et al. |
| 7,869,472 B2 | 1/2011 | Maleki et al. |
| 7,929,589 B1 | 4/2011 | Ilchenko et al. |
| 7,965,745 B2 | 6/2011 | Maleki et al. |
| 7,991,025 B2 | 8/2011 | Maleki et al. |
| 8,089,684 B1 | 1/2012 | Koonath et al. |
| 8,094,359 B1 | 1/2012 | Matsko et al. |
| 8,102,597 B1 | 1/2012 | Maleki et al. |
| 8,111,722 B1 | 2/2012 | Maleki et al. |
| 8,155,913 B2 | 4/2012 | Eliyahu et al. |
| 8,155,914 B2 | 4/2012 | Eliyahu et al. |
| 8,159,736 B2 | 4/2012 | Maleki et al. |
| 2001/0038651 A1 | 11/2001 | Maleki et al. |
| 2002/0018611 A1 | 2/2002 | Maleki et al. |
| 2002/0018617 A1 | 2/2002 | Iltchenko et al. |
| 2002/0021765 A1 | 2/2002 | Maleki et al. |
| 2002/0081055 A1 | 6/2002 | Painter et al. |
| 2002/0085266 A1 | 7/2002 | Yao |
| 2002/0097401 A1 | 7/2002 | Maleki et al. |
| 2003/0160148 A1 | 8/2003 | Yao et al. |
| 2004/0100675 A1 | 5/2004 | Matsko et al. |
| 2004/0109217 A1 | 6/2004 | Maleki et al. |
| 2004/0218880 A1 | 11/2004 | Matsko et al. |
| 2004/0240781 A1 | 12/2004 | Savchenkov et al. |
| 2005/0017816 A1 | 1/2005 | Ilchenko et al. |
| 2005/0063034 A1 | 3/2005 | Maleki et al. |
| 2005/0074200 A1 | 4/2005 | Savchenkov et al. |
| 2005/0123306 A1 | 6/2005 | Ilchenko et al. |
| 2005/0128566 A1 | 6/2005 | Savchenkov et al. |
| 2005/0175358 A1 | 8/2005 | Ilchenko et al. |
| 2005/0248823 A1 | 11/2005 | Maleki et al. |
| 2007/0009205 A1 | 1/2007 | Maleki et al. |
| 2007/0153289 A1 | 7/2007 | Yilmaz et al. |
| 2008/0001062 A1 | 1/2008 | Gunn et al. |
| 2008/0075464 A1 | 3/2008 | Maleki et al. |
| 2008/0310463 A1 | 12/2008 | Maleki et al. |
| 2009/0097516 A1 | 4/2009 | Maleki et al. |
| 2009/0135860 A1 | 5/2009 | Maleki et al. |
| 2009/0208205 A1 | 8/2009 | Eliyahu et al. |
| 2009/0251705 A1 | 10/2009 | Le et al. |
| 2009/0310629 A1 | 12/2009 | Maleki et al. |
| 2009/0324251 A1 | 12/2009 | Ilchenko et al. |
| 2011/0110387 A1 | 5/2011 | Maleki et al. |
| 2011/0150485 A1 | 6/2011 | Seidel et al. |
| 2011/0255094 A1 | 10/2011 | Mohageg et al. |
| 2012/0039346 A1 | 2/2012 | Liang et al. |

FOREIGN PATENT DOCUMENTS

| | | |
|---|---|---|
| WO | WO-2005/055412 A2 | 6/2005 |
| WO | WO-2005/067690 A2 | 7/2005 |
| WO | WO-2005/122346 A2 | 12/2005 |
| WO | WO-2006/076585 A2 | 7/2006 |
| WO | WO-2007/143627 A2 | 12/2007 |

OTHER PUBLICATIONS

Eliyahu, D., et al., "Low Phase Noise and Spurious Levels in Multi-Loop Opto-Electronic Oscillators," *Proceedings of the 2003 IEEE International Frequency Control Sympsoium and PDA Exhibition*, pp. 405-410, May 2003.

Eliyahu, D., et al., "Modulation Response ($S_{21}$) of the Coupled Opto-Electronic Oscillator," *Proceedings of the 2005 IEEE International Frequency Control Symposium and Exposition*, pp. 850-856, Aug. 2005.

Eliyahu, D., et al., "Tunable, Ultra-Low Phase Noise YIG Based Opto-Electronic Oscillator," *IEEE MTT-S International Microwave Symposium Digest*, 3:2185-2187, Jun. 2003.

Gorodetsky, M.L., et al., "Optical Microsphere Resonators: Optimal Coupling to High-$Q$ Whispering-Gallery Modes," *J.Opt. Soc. Am. B*, 16(1):147-154, Jan. 1999.

Gorodetsky, M.L., et al., "Rayleigh Scattering in High-$Q$ Microspheres," *J. Opt. Soc. Am. B*, 17(6):1051-1057, Jun. 2000.

Gorodetsky, M.L., et al., "Ultimate $Q$ of Optical Microsphere Resonators," *Optics Letters*, 21(7):453-455, Apr. 1996.

Hryniewicz, J.V., et al., "Higher Order Filter Response in Coupled Microring Resonators," *IEEE Photonics Technology Letters*, 12(3):320-322, Mar. 2000.

Huang, S., et al., "A 'Turnkey' Optoelectronic Oscillator with Low Acceleration Sensitivity," *2000 IEEE/EIA International Frequency Control Symposium and Exhibition*, pp. 269-279, Jun. 2000.

Ilchenko, V., et al., "Electrooptically Tunable Photonic Microresonators and Photonic Bandgap Waveguide Coupling for Micro-Optoelectronic Oscillators," *GOMACTech 2003*, Tampa, Florida, pp. 1-4.

Ilchenko, V., et al., "High-Q Microsphere Cavity for Laser Stabilization and Optoelectronic Microwave Oscillator," *Proceedings SPIE Microresonators and Whispering-Gallery Modes*, vol. 3611, pp. 190-198, Jan. 1999.

Ilchenko, V., et al., "Microsphere Integration in Active and Passive Photonics Devices," *Proc. of SPIE Laser Resonators III*, vol. 3930, pp. 154-162, Jan. 2000.

Ilchenko, V., et al., "Microtorus: A High-Finesse Microcavity with Whispering-Gallery Modes," *Optics Letters*, 26(5):256-258, Mar. 2001.

Ilchenko, V., et al., "Pigtailing the High-$Q$ Microsphere Cavity: A Simple Fiber Coupler for Optical Whispering-Gallery Modes," *Optics Letters*, 24(11):723-725, Jun. 1999.

Ilchenko, V., et al., "Sub-Micro Watt Photonic Microwave Receiver," *IEEE Photonics Technology Letters*, 14(11):1602-1604, Nov. 2002.

Ilchenko, V., et al., "Tunability and Synthetic Lineshapes in High-Q Optical Whispering Gallery Modes," *Proc. of SPIE Laser Resonators and Beam Control VI*, vol. 4969, pp. 195-206, Jan. 2003.

Ilchenko, V., et al., "Whispering-Gallery-Mode Electro-Optic Modulator and Photonic Microwave Receiver," *J. Opt. Soc. Am. B*, 20(2):333-342, Feb. 2003.

(56) References Cited

OTHER PUBLICATIONS

Ito, H., et al., "InP/InGaAs Uni-Travelling-Carrier Photodiode with 310 GHz Bandwidth," *Electronics Letters*, 36(21):1809-1810, Oct. 2000.

Logan, R., et al., "Stabilization of Oscillator Phase Using a Fiber-Optic Delay-Line," *IEEE 45th Annual Symposium on Frequency Control*, pp. 508-512, May 1991.

Maleki, L., "The Opto-Electronic Oscillator: Prospects for Extending the State of the Art in Reference Frequency Generation," *International Topical Meeting on Microwave Photonics*, pp. 195-198, Oct. 1998.

Matsko, A., et al., "Active Mode Locking with Whispering-Gallery Modes," *J. Opt. Soc. Am. B*, 20(11):2292-2296, Nov. 2003.

Matsko, A., et al., "Whispering-Gallery-Mode based Optoelectronic Microwave Oscillator," *Journal of Modern Optics*, 50(15-17):2523-2542, Feb. 2004.

Matsko, A., et al., "Whispering-Gallery-Mode Resonators as Frequency References. I. Fundamental Limitations," *J. Opt. Soc. Am. B*, 24(6):1324-1335, Jun. 2007.

Myers, L.E., et al., "Quasi-Phase-Matched Optical Parametric Oscillators in Bulk Periodically Poled $LiNbO_3$," *J. Opt. Soc. Am. B*, 12(11):2102-2116, Nov. 1995.

Savchenkov, A., et al., "RF photonic signal processing components: From high order tunable filters to high stability tunable oscillators," *IEEE Radar Conference*, pp. 1-6, May 2009.

Savchenkov, A., et al., "Tunable Resonant Single-Sideband Electro-Optical Modulator," *Digest of the IEEE/LEOS Summer Topical Meetings*, pp. 63-64, Jul. 2009.

Savchenkov, A., et al., "Whispering-Gallery-Mode Resonators as Frequency References. II. Stabilization," *J. Opt. Soc. Am. B*, 24(12):2988-2997, Dec. 2007.

Vassiliev, V.V., et al., "Narrow-Line-Width Diode Laser with a High-$Q$ Microsphere Resonator," *Optics Communications*, 158(1-6):305-312, Dec. 1998.

Yao, X.S., et al., "A Novel Photonic Oscillator," *Digest of the LEOS Summer Topical Meetings*, pp. 17-18, Aug. 1995.

Yao, X.S., et al., "A Novel Photonic Oscillator," *TDA Progress Report 42-122*, pp. 32-43, Aug. 1995.

Yao, X.S., et al., "Converting Light into Spectrally Pure Microwave Oscillation," *Optics Letters*, 21(7):483-485, Apr. 1996.

Yao, X.S., et al., "Coupled Optoelectronic Oscillators for Generating Both RF Signal and Optical Pulses," *Journal of Lightwave Tecnhology*, 18(1):73-78, Jan. 2000.

Yao, X.S., et al., "Dual Microwave and Optical Oscillator," *Optics Letters*, 22(24):1867-1869, Dec. 1997.

Yao, X.S., et al., "Multiloop Optoelectronic Oscillator," *IEEE Journal of Quantum Electronics*, 36(1):79-84, Jan. 2000.

Yao, X.S., et al., "Optoelectronic Microwave Oscillator," *J. Opt. Soc. Am. B*, 13(8):1725-1735, Aug. 1996.

Yao, X.S., et al., "Optoelectronic Oscillator for Photonic Systems," *IEEE Journal of Quantum Electronics*, 32(7):1141-1149, Jul. 1996.

Yu, J., et al., "Compact Optoelectronic Oscillator with Ultra-Low Phase Noise Performance," *Electronics Letters*, 35(18):1554-1555, Sep. 1999.

VOLTAGE CONTROLLED TUNABLE SINGLE SIDEBAND MODULATORS AND DEVICES BASED ON ELECTRO-OPTIC OPTICAL WHISPERING GALLERY MODE RESONATORS

PRIORITY CLAIM AND RELATED APPLICATIONS

This patent document claims the benefit of U.S. Provisional Application. No. 61/364,761 entitled "VOLTAGE TUNABLE SINGLE SIDE BAND OPTICAL MODULATOR BASED ON PERIODICALLY POLED WHISPERING GALLERY MODE RESONATOR" and filed Jul. 15, 2010, the disclosure of which is incorporated by reference as part of the disclosure of this document.

BACKGROUND

This document relates to systems, apparatus and techniques for signal modulation and other applications based on electro-optic optical resonators.

Optical resonators may be used to spatially confine resonant optical energy in a limited cavity with a low optical loss. The resonance of an optical resonator may be used to provide various useful functions such as optical filtering, optical modulation, optical amplification, optical delay, generation of oscillation signals and others. Light can be coupled into or out of optical resonators via various coupling mechanisms according to the configurations of the resonators.

Optical whispering gallery mode (WGM) resonators are special optical resonators that confine light in one or more whispering gallery modes. Light in a whispering gallery mode propagates in a closed circular optical path and is reflected at the boundary of the resonator due to the total internal reflection. Such as, light in a WGM resonator "leaks" out of the exterior surface of the closed circular optical path of a WGM resonator via the evanescence field of the WG mode. An optical coupler can be used to couple light into or out of the WGM resonator via this evanescent field. WGM resonators can be advantageously used in various optical, photonic, RF and microwave applications.

SUMMARY

This document discloses, among others, examples and implementations of photonic devices and techniques based on tunable single sideband (SSB) modulation in whispering gallery mode resonators formed of electro-optic materials.

In one aspect, a device based on a whispering gallery mode optical resonator is disclosed to include a laser that produces continuous wave (CW) laser light at a laser frequency; an optical resonator structured to include different poled electro-optic domains and to support whispering gallery modes circulating in the optical resonator to effectuate a single sideband (SSB) on only one side of the laser frequency without having a mirror image sideband on the other side of the laser frequency; an evanescent optical coupler located to couple the laser light from the laser into the optical resonator; electrodes formed on the optical resonator to include at least one DC bias electrode to receive a DC bias voltage and at lease one RF electrode to receive an RF signal to produce the optical single sideband (SSB); and a bias control circuit coupled to the DC bias electrode to apply and adjust the DC bias voltage to tune a frequency spacing between the optical single sideband and the optical frequency.

In another aspect, aA method for operating a whispering gallery mode optical resonator includes operating a laser to produce continuous wave (CW) laser light at a laser frequency; coupling the laser light into an optical resonator structured to include different poled electro-optic domains and to support whispering gallery modes circulating in the optical resonator to effectuate a single sideband (SSB) on only one side of the laser frequency without having a mirror image sideband on the other side of the laser frequency; applying an RF signal to the optical resonator to produce the optical single sideband (SSB) in the light within the optical resonator; and applying a DC bias voltage to the optical resonator to adjust the DC bias voltage to tune a frequency spacing between the optical single sideband and the laser frequency.

In yet another aspect, a device based on a whispering gallery mode optical resonator is disclosed to include a laser that produces continuous wave (CW) laser light at a laser frequency; an optical resonator structured to include different poled electro-optic domains and to support whispering gallery modes circulating in the optical resonator to effectuate a single sideband (SSB) on only one side of the laser frequency without having a mirror image sideband on the other side of the laser frequency; a laser locking mechanism that locks the laser to the optical resonator; electrodes formed on the optical resonator to include at least one DC bias electrode to receive a DC bias voltage and at lease one RF electrode to receive a modulation control signal to cause optical modulation in the different poled electro-optic domains to produce the optical single sideband (SSB); and an opto-electronic feedback loop that includes an optical part coupled to the optical resonator to receive modulated laser light coupled out of the optical resonator and an electrical part that produces the modulation control signal, and an optical detector coupled between the optical part and the electrical part. The opto-electronic feedback loop feeds the modulation control signal in phase to the RF electrode on the optical resonator. This device includes a bias control circuit coupled to the DC bias electrode to apply and adjust the DC bias voltage to tune a frequency spacing between the optical single sideband and the optical frequency.

These and other aspects, associated examples and implementations are described in detail in the drawings, the description, and the claims.

DETAILED DESCRIPTION

Figure 1A:
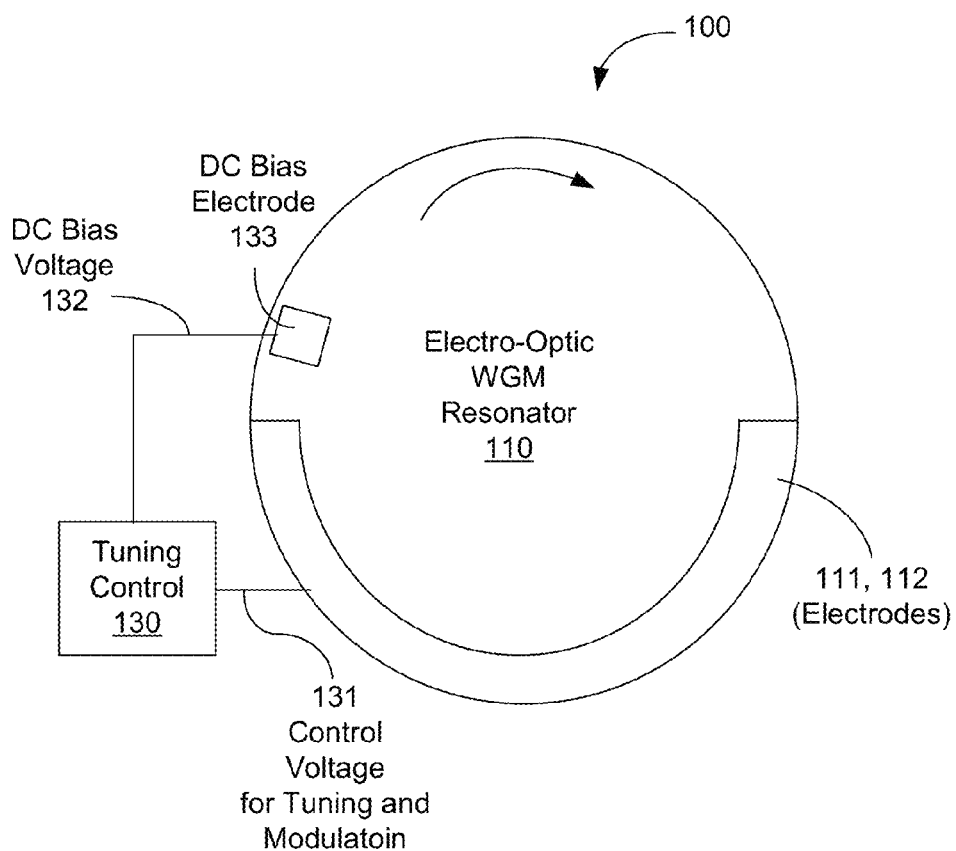
FIGS. 1A and 1B show an example of a tunable electro-optic WGM resonator modulator for single sideband (SSB) modulation based on cross-modulation between two different families of WGM modes of different polarizations in the WGM resonator.

Tunable single sideband (SSB) modulators as described in this document and other devices and systems based on such tunable SSB modulators use WGM resonators made of suitable electro-optic materials, including poled electro-optic materials with different poled electro-optic domains and other electro-optic materials that lead to coupling between two orthogonally polarized whispering gallery modes in response to an applied RF signal. The coupling between two orthogonally polarized whispering gallery modes is used to achieve the SSB modulation and the tuning of the frequencies of the two orthogonally polarized whispering gallery modes is used to tune the frequency of the signal modulation. This tuning can be independent of the free spectral range of the WGM resonator and thus can be beneficial in various applications, including signal modulation and signal generation applications, wherein frequency tuning is needed. The SSB modulators based on electro-optic WGM resonators with different poled electro-optic domains provide internal material structure to support SSB operation without requiring external polarization control associated with SSB operation based on cross-modulation between two different families of WGM modes of different polarizations in the WGM resonator and thus, SSB modulators based on electro-optic WGM resonators with different poled electro-optic domains can be implemented with a relatively simplified device structure.

WGM resonators can be structured to be axially or cylindrically symmetric around a symmetry axis around which the WG modes circulate in a circular path or the equator. The exterior surface of such a resonator is smooth and provides spatial confinement to light around the circular plane to support one or more WG modes. The exterior surface may be curved toward the symmetry axis to spatially confine the light along the symmetry axis. A WGM resonator may be shaped symmetrically around a symmetry axis and has a protruded belt region to form a circular path to confine light in one or more WG modes. The exterior surface of the protruded belt region may be any suitable geometrical shape such as a flat surface or a curved surface. Such a WGM resonator may be configured in a desired physical size for a given wavelength of light. Various materials can be used for WGM resonators and include, for example, crystal materials and non-crystal materials. Some examples of suitable dielectric materials include fused silica materials, glass materials, lithium niobate materials, and calcium fluoride materials.

A whispering gallery mode resonator can be made of a material exhibiting an electro-optic effect and can include electrodes on the optical resonator to apply an RF or microwave signal to the optical resonator to effectuate the electro-optic effect to control the one or more optical whispering gallery modes circulating along a circular optical loop near a rim of the optical resonator. The electro-optic effect in such a WGM resonator can be used to tune the resonance of the WGM resonator and to modulate light.

Figure 1B:
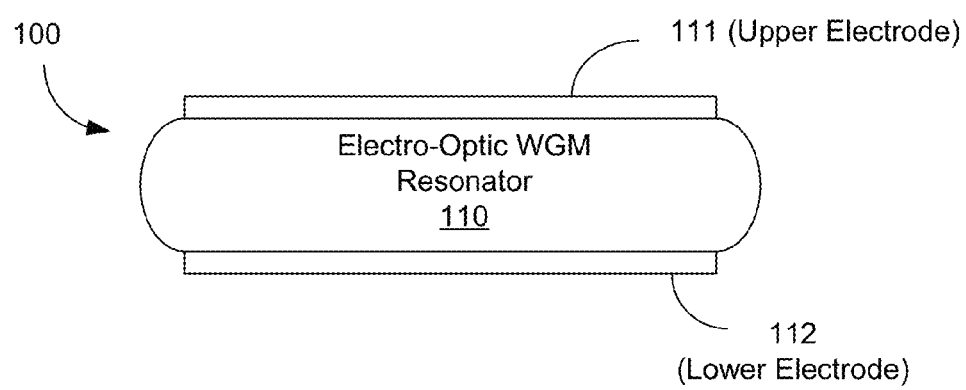

FIGS. 1A and 1B show an example of an electro-optic modulator (EOM) 100 having an electro-optic WGM resonator 110. The electro-optic material for the entire or part of the resonator 110 may be an electro-optic crystal or a semiconductor multiple quantum well structure. One or more electrodes 111 and 112 may be formed on the resonator 110 to apply a control electrical field in at least the region where the WG modes are present to control the index of the electro-optical material and to change the filter function of the resonator. Assuming the resonator 110 has disk or ring geometry, the electrode 111 may be formed on the top of the resonator 110 and the electrode 112 may be formed on the bottom of the resonator 110 as illustrated in the side view of the device in FIG. 1B. In one implementation, the electrodes 111 and 112 may constitute an RF or microwave resonator to apply the RF or microwave signal to co-propagate along with the desired optical WG mode. For example, the electrodes 111 and 112 may be microstrip line electrodes. The electrodes 111 and 112 may also form an electrical waveguide to direct the electrical control signal to propagate along the paths of the WG modes. A tuning control unit 130 such as a control circuit may be used to supply the electrical control signal 131 to the electrodes 111 and 112.

In operating the resonator modulator 100, the control unit 130 may supply a voltage as the electrical control signal to the electrodes 111 and 112 as the modulation control signal. A DC bias electrode 133 can be provided to supply a DC voltage 132 to set the resonance peak of the resonator 100 at a desired spectral location. The DC voltage may be adjusted by the control unit 630 to tune the spectral position of the transmission peak when such tuning is needed.

For example, a Z-cut LiNbO$_3$ disk cavity with a diameter of d=4.8 mm and a thickness of 170 μm may be used as the resonator 610. The cavity perimeter edge may be prepared in the toroidal shape with a 100 μm radius of curvature. As an alternative to the strip electrodes shown in FIG. 1A, the top and bottom surfaces of the disk resonator may be coated with conductive layers for receiving the external electrical control signal. A metal such as indium may be used to form the conductive coatings. The signal modulation is achieved by applying and adjusting a modulation control voltage to the top and bottom conductive coatings. Each conductive coating may be absent on the central part of the resonator and are present at the perimeter edge of the resonator where WGMs are localized.

The electro-optic modulator (EOM) in FIGS. 1A and 1B may be constructed based on coupling between WGM modes of the same polarization via the electro-optic effect. Such EOM devices can be tuned in frequency but the tuning is limited by the free spectral range (FSR) of the WGM modes of the WGM resonator.

Certain electro-optic materials exhibit non-zero off-diagonal elements of their electro-optic tensors and can be used to effectuate coupling of two orthogonally polarized WG modes of an electro-optic WGM resonator modulator via interaction with the applied RF or microwave (MW) signal. This RF/MW-coupled interaction between two family modes of orthogonal polarizations, e.g. the transverse magnetic (TM) mode and the transverse electric (TE) mode, can be used to construct an electro-optic WGM resonator modulator to achieve tunable single sideband (SSB) modulation. For example, based on the modulator design in FIGS. 1A and 1B, WGM resonators made of LiNbO$_3$ and LiTaO$_3$ or other electro-optic crystals with the desired non-zero off-diagonal elements of their electro-optic tensors can be used to create coupling between light and RF fields, achieved by engineering the shape of a micro-strip RF resonator coupled to a WGM resonator. The modulation is achieved between the WGM modes separated not by the free spectral range (FSR) of the resonator, but rather by some frequency given by the resonator shape, temperature, and the bias voltage.

The light confined in two optical WGMs characterized with electric field operators $\vec{E}_1$ and $\vec{E}_2$ is coupled with the RF field $\vec{E}_M$ in the case of nonzero interaction energy $$E = \frac{1}{8\pi} \int_V \sum_{i,j,k} r_{ijk} D_i D_j E_{Mk} dv,$$

where $r_{ijk}$ describes the space dependent electro-optic nonlinearity of the resonator host material, $D_i = \Sigma_l \epsilon_{il} E_l$, electric field $E_l$ is presented as a sum of two counter-propagating waves, and V is the volume of the WGM resonator.

The interaction between two WGM mode families having different polarizations allows the two WGM mode families to be tuned with respect to each other using the same tuning mechanism, e.g., adjusting the DC bias voltage applied to the resonator. The interaction of two WGM mode families allows the single sideband modulation in the system.

The interaction between the light and RF signal is not always possible. For instance, if the RF field is homogeneous and is applied along, e.g., Z-axis of a lithium niobate WGM resonator, the coupling between the optical TM modes with the electric field parallel to the Z axis and the optical TE modes with the electric field perpendicular to the Z axis is forbidden. It is possible to realize resonators where neither pure TE nor pure TM mode families exist. The interaction is allowed among those modes if the spatial overlap integral between the modes is not zero.

Electro-optic materials with non-zero non-diagonal elements of their linear electro-optic tensors can be used to achieve interaction of two orthogonally polarized modes. For example, lithium niobate has nonzero electro-optic coefficients $r42=r51$. Those coefficients introduce coupling between TE and TM WGMs in a resonator fabricated from a z-cut LiNbO3 preform if the RF field has a radial component. The space averaged interaction energy for the optical and RF fields is given by $$E = \frac{n_e^2 n_o^2}{4\pi} \int_V r_{51} (\vec{E}_{TM} \cdot \vec{E}_{RF}) E_{TE}^* dv,$$

where the condition of $\vec{E}_{TE} = \vec{z} E_{TE}$ is applied. The averaged interaction energy is generally zero because $n_e \neq n_o$. However, either periodical poling of the material or creating a special electrode shape for the RF mode phase matches the interaction such that $E \neq 0$. A composite resonator can be fabricated from, e.g., x-cut and z-cut cylindrical segments attached together so that the nonzero interaction can be achieved.

Figure 2:
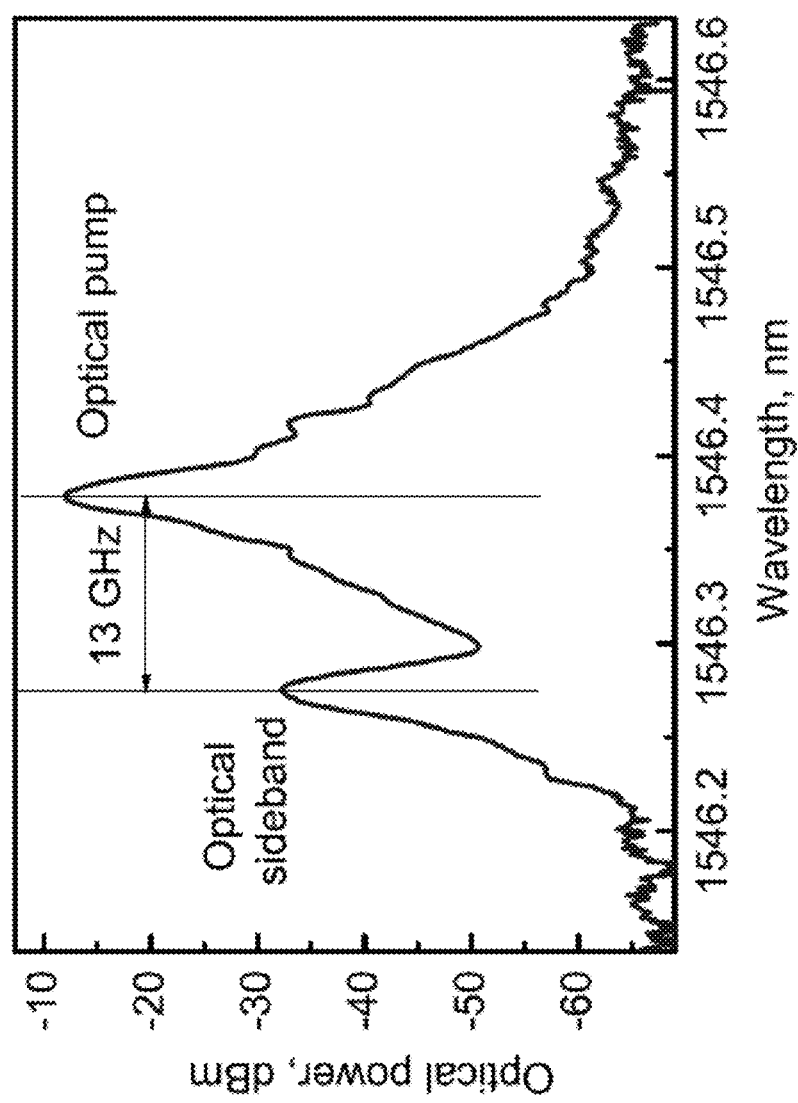
FIGS. 2, 3, 4A and 4B illustrate operations of the modulator for SSB modulation in FIGS. 1A and 1B.

FIG. 2 shows a measured optical spectrum obtained from an exemplary SSB EOM modulator using a lithium niobate crystal WGM resonator having a 35-GHz free spectral range. The interaction of TE and TM mode families was effectuated to achieve single sideband modulation where only one sideband was generated at the spacing of 13 GHz from the optical frequency of the optical pump light. The resonator modulation was achieved between the TE and TM modes separated not by the free spectral range (35 GHz) of the resonator, but rather by some value (13 GHz) given by the resonator shape, the resonator temperature, and the bias voltage applied to the resonator. For two WGM mode families having different polarizations, optical frequencies of the two mode families are shifted with respect to each other in the frequency space. As such, it is possible to realize single sideband tunable modulation in the system.

Figure 3:
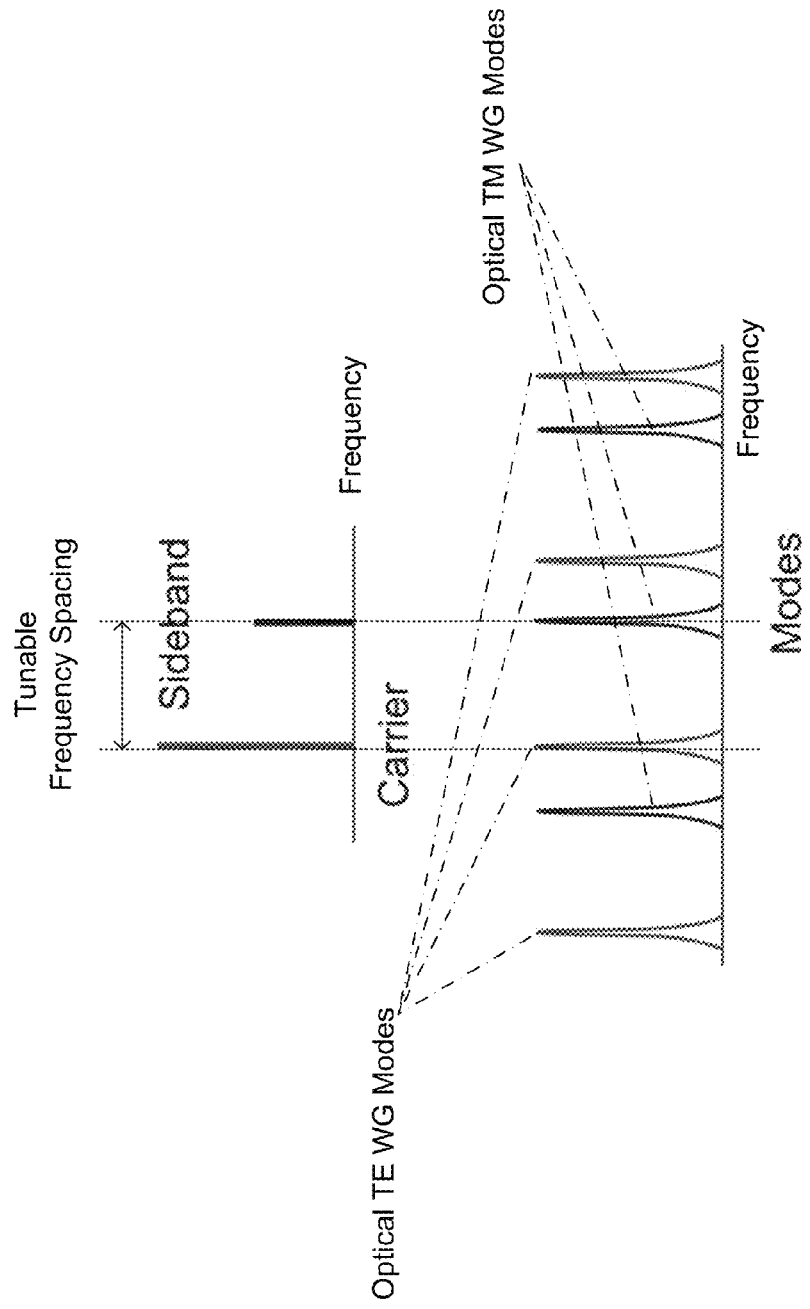

FIG. 3 illustrates the spectral properties of SSB modulation in an electro-optic WGM resonator modulator configured under the design in FIGS. 1A and 1B. The upper diagram shows the entire spectrum of the optical output of the electro-optic WGM resonator modulator without any optical filtering, where only a single modulation sideband is generated on one side of the optical carrier. The lower diagram shows two families of WG modes with orthogonal polarizations (TE and TM modes) that support light at the optical carrier frequency and the generated single sideband. This TE-TM waveguide mode coupling via off-diagonal elements of the electro-optic tensor of the modulator host material is a departure from the resonant electro-optic WGM resonator modulators based on coupling between modes of the same family (TE-TE or TM-TM) using diagonal elements of an electro-optic tensor of the host electro-optic material. Referring to FIGS. 1A and 1B, the shape of the RF electrodes applied to an electro-optic crystal (e.g., Z-cut lithium tantalite crystal) in a WGM resonator can be structured to effectuate an efficient coupling of TE whose electric field is perpendicular to the Z axis and TM whose electric field is parallel to the Z axis, where the Z axis is the symmetry axis of the resonator coinciding with the c axis of the crystal.

Notably, the TE and TM WGM modes respectively at the optical carrier frequency and the frequency of the single sideband in FIG. 3 is separated not by the optical free spectral range of the WGM resonator, but rather by some frequency determined by the electro-optic effect in the resonator, e.g., determined by one or combination of various influences that affect the electro-optic effect in the resonator, e.g., resonator shape, temperature, and the bias voltage. Based on this, the TE and TM mode families can be tuned with respect to one another using the electro-optic effect by changing the electro-optic coefficients for agile tunability of the modulation frequency which is the difference between the optical carrier and the frequency of the generated single sideband (upper diagram of FIG. 3). The tenability comes from the different responses of the TE and the TM modes to an external energy or influence applied to the crystal for changing the electro-optic coefficients. One exemplary technique for tuning this frequency is to change a DC bias voltage on the crystal. One another exemplary technique for tuning this frequency changes the temperature of the crystal. Yet another exemplary technique for tuning this frequency is to apply a force to compress the crystal.

Figure 4A:
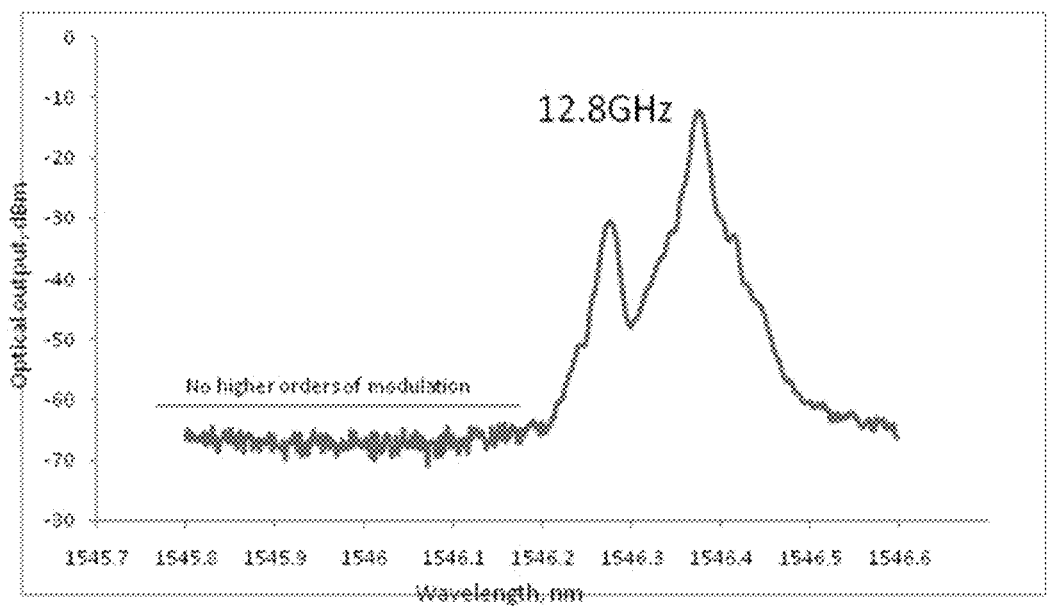
Figure 4B:
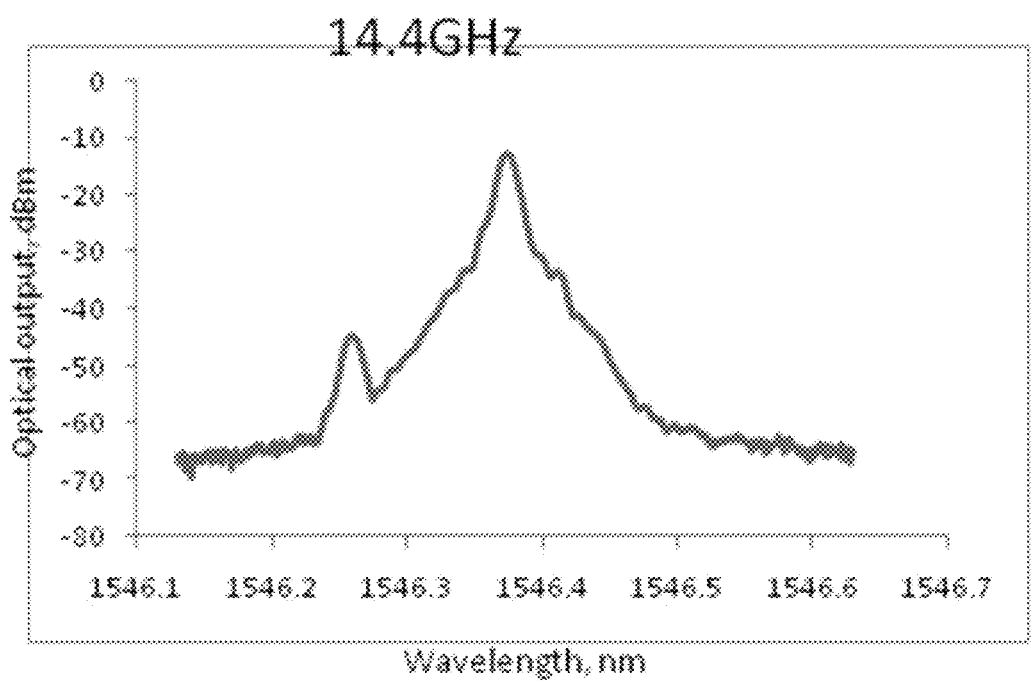

FIGS. 4A and 4B show measurements of optical spectra of a SSB modulator made of a lithium niobate WGM resonator under two different DC bias voltages. FIG. 4A shows a frequency spacing of about 12.8 GHz between the SSB peak and the optical carrier frequency under a first DC bia voltage and FIG. 4B shows a frequency spacing of about 14.4 GHz between the SSB peak and the optical carrier frequency under a second, different DC bia voltage. Therefore, the DC bias voltage is adjusted to tune the modulation frequency from 12.8 GHz to 14.4 GHz.

In this regard, the SSB modulation provides a method for operating a WGM resonator to achieve SSB operation. This method includes coupling light into an optical resonator made of a crystal (e.g., a ferroelectric crystal) and structured to support optical whispering gallery modes in two orthogonally polarized TE and TM modes circulating along a circular optical loop near a rim of the optical resonator; and applying an RF or microwave signal to the optical resonator in an electric field polarization oriented relative to a crystal axis of the crystal to effectuate coupling between light in an optical whispering gallery mode in the TE mode and light in another optical whispering gallery mode in the TM mode to produce a tunable optical single sideband modulation at a modulation frequency equal to a difference in optical frequencies of the optical whispering gallery modes in the TE and TM modes.

Figure 5:
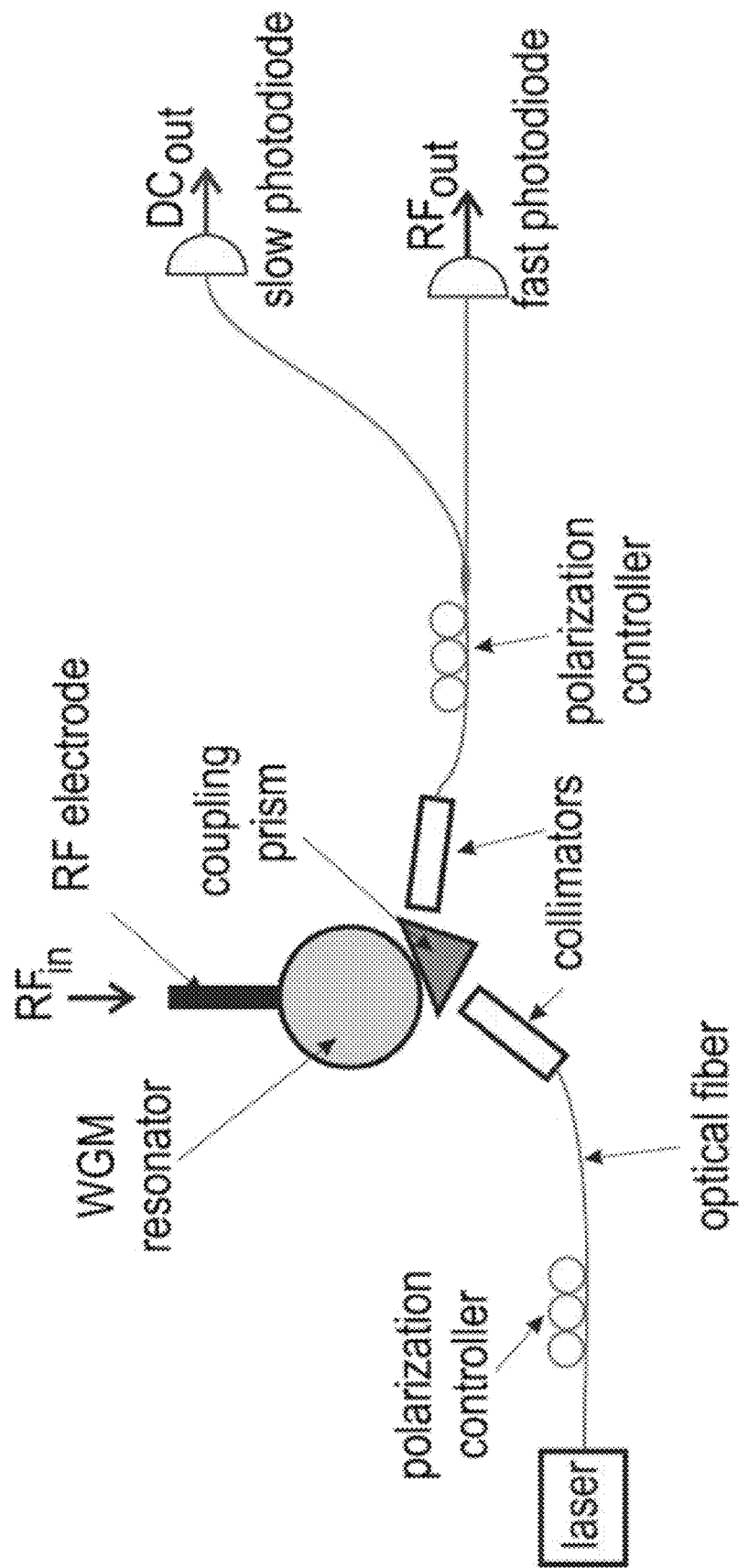
FIG. 5 shows an example of a tunable SSB WGM resonator modulator.
Figure 6:
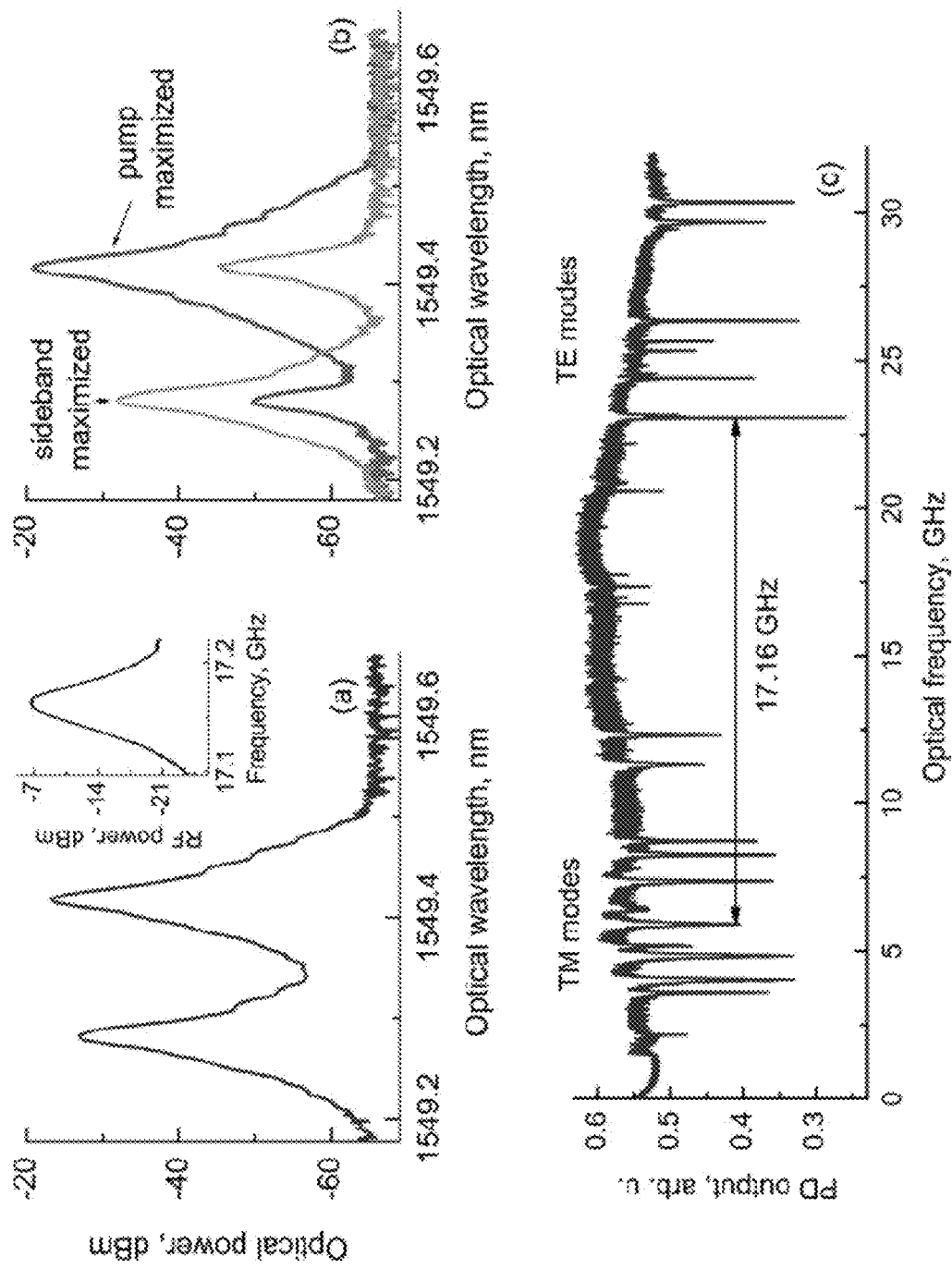
FIG. 6 shows measurements obtained in the modulator in FIG. 5.

As specific examples, WGM resonators made of $LiNbO_3$ and $LiTaO_3$ can be used for SSB modulators to create coupling between light and RF fields, achieved by engineering the shape of a micro-strip RF resonator coupled to a WGM resonator. FIG. 5 shows an example of such a SSB modulator based on an electro-optic WGM resonator and FIG. 6 shows measurements obtained from this SSB modulator.

In FIG. 5, a toroidal WGM resonator is placed to a conductive substrate and an rf electric field is applied to its rim. The resonator is fabricated of Z-cut lithium tantalate and the symmetry axis of the resonator coincides with the c axis of the crystal. The stripline rf electrode is situated in the direct vicinity of the localization of the basic WGM sequence. The electrode is designed in such a way that the rf electric field is polarized orthogonally to the surface of the resonator and is maximized at the extremity perimeter of the resonator. A dc electric field is applied along the Z axis of the resonator to tune the WGM spectrum.

Light from a laser is coupled into and out of the WGM resonator via a coupling prism. Optical collimators are used for coupling light into and out of the prism in such a way that the fundamental TM and TE mode sequences (the closest to the resonator surface) are excited with the light. In conducted tests, a WGM resonator of a diameter of 935 μm and 100 μm in thickness was used and was measured to have an optical free spectral range of 48 GHz. The rim of the resonator was shaped as a toroid such that the cross section of the modes belonging to the basic WGM family with nearly orthogonal polarizations was an ellipse with dimensions of 1.6 μm and 7.5 μm. All the modes have approximately the same intrinsic (unloaded) quality factor resulting from the material absorption, reaching $6 \times 10^8$ at 1550 nm for the particular sample. The resonator was overloaded with the prism so that the FWHM of the TE and TM modes became 1 and 20 MHz, respectively.

As illustrated in FIG. 5, a first polarization controller is provided between the laser and the WGM resonator to control the input polarizaiton so that both light in both TM and TE modes is present in the resonator. A second polarizaiton controller in the output path of the light coupled out of the resonator. Two photodetectors are used in FIG. 5 to measure different signal components in the output light of the SSB modulator. A fast photodiode is used to measure the RF output and a slow photodiode is used to measure the DC output. In this SSB WGM modulator, the pump light and the light in the single sideband are orthogonally polarized with respect to each other. This feature allows for implementation of a polarization selective detection to reduce the noise in the optical to RF conversion part of the device.

FIG. 6 shows measurements of the performance of the above exemplary SSB modulator. FIG. 6(a) shows the measured spectrum of the light exiting the modulator showing presence of only one sideband. The inset in FIG. 6(a) shows the spectrum of the RF return of the optical signal demodulated on a fast photodiode showing the resonant modulation frequency of 17.16 GHz and the spectral width of 20 MHz. The angle of the polarizer installed after the WGM resonator is selected such that the rf return power is maximized. FIG. 6(b) shows the measured optical spectrum shown in FIG. 6(a) with the polarizer installed after the resonator tuned ±45° with respect to the position selected to obtain FIG. 6(a). Hence, the optical carrier and the sideband are polarized orthogonally. FIG. 6(c) shows the measured optical spectrum of the WGM resonator showing the modes involved with the modulation process.

In the conducted measurements, application of the rf field to the RF electrode caused the modulation at the separation frequency of TE and TM modes shown in FIG. 6(a). The modulation was measured by using both an optical spectrum analyzer and an rf spectrum analyzer. The modulation has only one first-order sideband, no second-order sideband, and no symmetrical sideband. The experimentally measured sideband suppression exceeds 40 dB and is given by the noise floor of our spectrum analyzer. A coherent detection technique was used to improve the measurement sensitivity by 20 dB and the second sideband was not detected in the measured spectrum. The optical polarizer placed after the modulator was rotated to suppress either the carrier or the sideband, proving that they are orthogonally polarized as shown in FIG. 6(b).

The above measurements indicate that the coupling between TM and TE modes was efficient in the tested device. The optical sideband power became equal to the carrier power only for 2 mW of rf power applied to the resonator. The light escaping the modulator was captured by the slow photodiode and the changes caused by loading the resonator was tracked with and without the applied rf field. The spectrum of the optically pumped mode appears as a dip if no rf field is present; the dip decreases if the rf field is applied. Pumping light into the spectrally broader mode caused the appearance of a narrow transparency peak inside the absorption curve.

The SSB modulator is tunable by tuning either or both of the temperature of the resonator and the DC voltage applied to the top and the bottom surfaces of the resonator. Tests were conducted to show a frequency shift of the WGM spectrum caused by the temperature change and the DC voltage change. The TE and the TM modes shift with different rates so that the relative frequency of the mode families changes resulting in modification of the modulation frequency. Measurements showed 1 GHz/K thermal and 80 MHz/V electro-optical shifts of the modulation frequency. In tuning the modulation frequency, the frequency of the laser carrier is tuned to follow one of the WGMs. One of the advantages of the electro-optical frequency tuning is its agility, and the tuning speed reaches 1 GHz/μs for the setup reported here. The tunability range can approach tens of gigahertz and is fundamentally limited either by the damage of the material with the applied dc electric field (2 kV/mm for stoichiometric LiTaO3) or by the mechanical damage from the differential thermal expansion of the setup.

A SSB modulator can be configured so that the electrode couples an RF signal in a polarization that is in the plane of the optical loop in the WGM resonator equator in which the light is confined. Such a SSB modulator can, for example, include a disk WGM resonator made of an electro-optic material, a bottom electrode which can be made of a copper cylindrical post, a top electrode, and an RF electrode resonator placed in contact with the exterior surface of the WGM resonator equator. The terminal end of the RF electrode resonator that is in contact with the WGM resonator is separated from the bottom and top electrodes. The modulation frequency depends on the difference of optical frequency between TE and TM optical modes. Natural birefringence of ferroelectrics materials results in a Vernier effect between combs of the fundamental TE modes and fundamental TE modes. The optical frequencies of the fundamental TE and TM modes of whispering gallery mode resonator 110 can be expressed as:

$$f_{TE} = \frac{c}{(n_o \pi D)\left(l + 2.34^3 \sqrt{\frac{l}{2}}\right)}$$

$$f_{TM} = \frac{c}{(n_e \pi D)\left(l + 2.34^3 \sqrt{\frac{l}{2}}\right)}$$

where l is the mode number. The difference between two modes can be calculated and predicted for a given electro-optic material with the ordinary-wave refractive index nO and the extra-ordinary-wave refractive index ne, the diameter (D) and the optical wavelength.

The cross-modulation between two different families of WGM modes of different polarizations in the WGM resonator is used to achieve the SSB modulation. In optically transparent ferroelectrics crystals, e.g., lithium niobate and lithium tantalite, electro-optical indexes of ordinary and extraordinary polarization differ significantly. This allows simple and efficient differential detuning of one WGM mode in one polarization from another WGM mode in an orthogonal polarization by a tuning mechanism that tunes both mode frequencies, e.g., adjusting the DC bias voltage. This DC vias voltage can be mixed with an additional microwave field of frequency equal to difference of resonant optical frequencies the modes would interact if the phase is properly matched in a collinear configuration. Phase matching does not happen automatically since refractive indexes of ordinary, extraordinary optical modes and the microwave mode are different. One solution is to exploit specifically undulated electrode which modulates electric field along the rim of the WGM resonator. The frequency of the desired spatial modulation is determined from phase matching conditions:

$$\frac{\omega_2}{c} n_2 - \frac{\omega_1}{c} n_1 \pm \frac{\omega_2 - \omega_1}{c} N_{eff} = \frac{2\pi}{\Delta}$$

To estimate this value, consider the situation where $(\omega_2 - \omega_1)/2\pi$ is close to the FSR of the resonator, $$A = \frac{D}{2\Delta},$$

and $\omega_1$ and $\omega_2$ correspond to the optical frequencies of the two modes.

$$A = \frac{2\pi}{l \frac{n_2 - n_1}{n} + \left(1 \pm \frac{N_{eff}}{n}\right)}$$

where l is the mode number. The phase matching occurs when the disk diameter for a lithium tantalite WGM disk resonator is about 116 μm and the disk diameter for a lithium niobate WGM disk resonator is about 8 μm.

An optical grating written on electrode of the modulator designed for phase matching in tantalate resonators of 400-μm diameter has a period of 138 degrees. For lithium niobate, this value is about 6 degrees. Both gratings can be fabricated with lithography or other techniques. This kind of modulation accepts one polarization of light, and rotates its polarization during modulation in response to an RF or microwave signal.

The electro-optical WGM resonator modulator operates at differential frequencies between optical modes in mutually orthogonal polarizations. In some nonlinear crystals, this difference in frequency can be tuned with the control voltage and the operating temperature. For instance, lithium niobate shows three times different electro-optical index of both polarizations. It was previously demonstrated that fast frequency shift of the resonator made of lithium niobate is as high as 20 GHz per 100V for one and 7 GHz for another. Thus tunability span based on lithium niobate cross-mode modulator is 13 GHz. Hence, the operational frequency of 35 GHz high-efficient receiver can be changed very quickly by voltage through ~30%. On the other hand thermal operational point can change this differential frequency even further to terahertz range. The SSB modulation used in the present designs eliminates the mode for the second sideband. Lithium tantalate-based modulators tend to have better efficiency of modulation than lithium niobate based modulators since mode overlapping in the Lithium tantalate is much better as a result of very similar refractive indexes of both polarizations.

Therefore, the present SSB modulator designs combine advantages of narrowband high-Q-factor WGMR-based modulator with tunability and can be tuned within the differential detuning range. The tuning range can cover various ranges in applications, e.g., from X band to W band in some implementations.

A tunable SSB modulator can also be formed by using a domain engineered electro-optic WGM resonator to include different regions of optical nonlinear and nonlinear structures to produce optical spectra of WGM resonator modes that change with a change in an external control signal, such as a DC bias voltage, where different WGM resonator modes change differently under the same change in the external control signal. Therefore, the spectra of the WGM resonator modes are reconfigurable by the external control signal and are referred to as reconfigurable spectra. In some implementations of such domain engineered WGM resonators, the mode frequency of certain WGM resonator modes can remain unchanged while the mode frequencies of other WGM resonator modes shift by a non-zero amount.

Domain engineered electro-optic WGM resonators can be in various configurations. For example, a periodically poled ferroelectric disk WGM resonator can include an inverted domain structure having an azimuthally symmetric arc section concentric with the resonator center axis. Referring to FIGS. 1A and 1B, the electro-optical resonator 110 can be configured to have a concentric-ring ferroelectric-domain structure. The different poled electro-optic domains produce a perturbation in the refractive index of the WGM resonator and thus can be used to engineer spectral properties of the WGM resonator modes. In particular, the different poled electro-optic domains are structured to support whispering gallery modes circulating in the optical resonator to effectuate a single sideband (SSB) on only one side of the laser frequency of the laser light coupled into the resonator without having a mirror image sideband on the other side of the laser frequency.

Figure 7A:
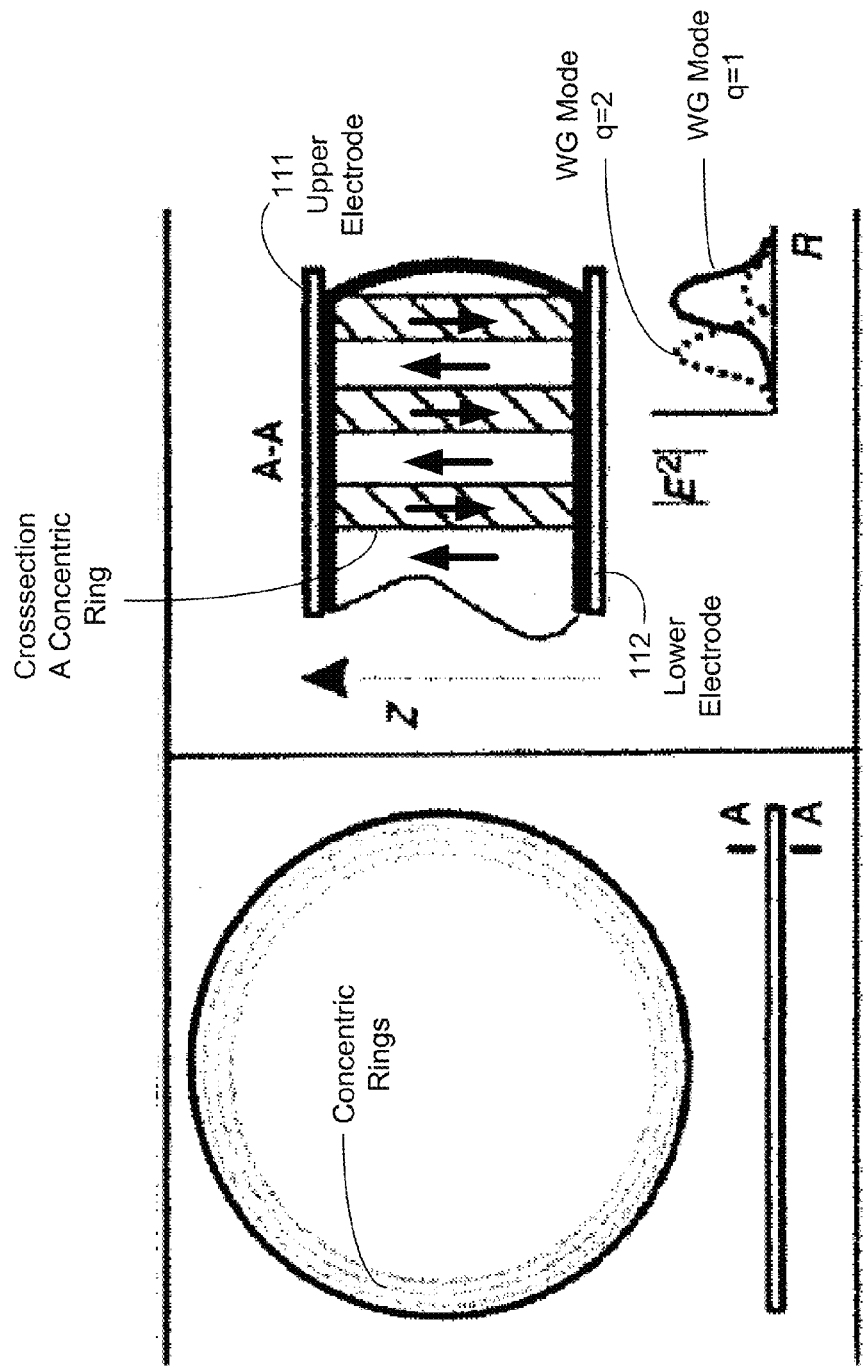
FIG. 7A shows a WGM resonator having different poled electro-optic domains and to support whispering gallery modes circulating in the optical resonator to effectuate a single sideband (SSB) on only one side of the laser frequency without having a mirror image sideband on the other side of the laser frequency.

FIG. 7A shows an example of different poled electro-optic domains in an electro-optic WGM resonator. The left hand side of FIG. 7A shows a top view of the periodically poled ferroelectric disk WGM resonator with domains that are poled in polarization along either +z direction (non-shadowed regions) or −z direction (shadowed regions). The right hand side of FIG. 7A shows the cross sectional view of a portion near the edge of the resonator. This poled ring structure can be formed by applying a sufficiently strong DC voltage to cause a permanent change in the crystal structure of the material polarization at selected locations.

A WGM resonator mode can be represented by a wave function in terms of spherical harmonics with three mode parameters l, m and q where l index represents azimuthal quantum number corresponding to the number of intensity maxima along the equator of the resonator, the m index is the polar quantum number and the q index is the radial quantum number corresponding to the number of intensity maxima long the radial direction for the equator. The insert on the right hand side of FIG. 7A shows the spatial radial profiles of two different WGM modes where the WGM mode with q=1 is in the solid line and the WGM mode with q=2 is in the dotted line. The different poled electro-optic domains can be designed to render the frequencies of certain modes to vary with the DC bias voltage while other modes change little or relatively insignificantly with the change in the DC bias voltage. As a specific example, the concentric rings in FIG. 7A can be designed so that the WGM mode with q=1 in the solid line does not significantly change its frequency with a change in the DC bias voltage while the WGM mode with q=2 in the dotted line significantly changes its frequency with the change in the DC bias voltage.

In one implementation, the electro-optic material for the disk WGM resonator can be lithium niobate in a disk shape with 2.6 mm in diameter and 120 microns in thickness and is configured to include the ring-like inversion of the ferroelectric domain orientation. DC electrodes are formed on top and bottom sides of the resonator, and a bias electric field is applied via the DC electrodes. WGM resonator modes that have a field intensity maxima outside of the ring (radial quantum number q=1 modes) are shifted in frequency through the Pockell's effect under the DC bias. WGM resonator modes that have two field intensity maxima, one within and one without the ring (a WGM mode with q=2, for example) undergoes a frequency shift that is orders of magnitude smaller than the WGM resonator modes with q=1. The relative difference frequency between the WGM mode with q=1 and the WGM mode with q=2 can grow in proportion to the applied bias field. This relationship allows tuning the relative frequency difference by adjusting the applied bias field.

Figure 7B:
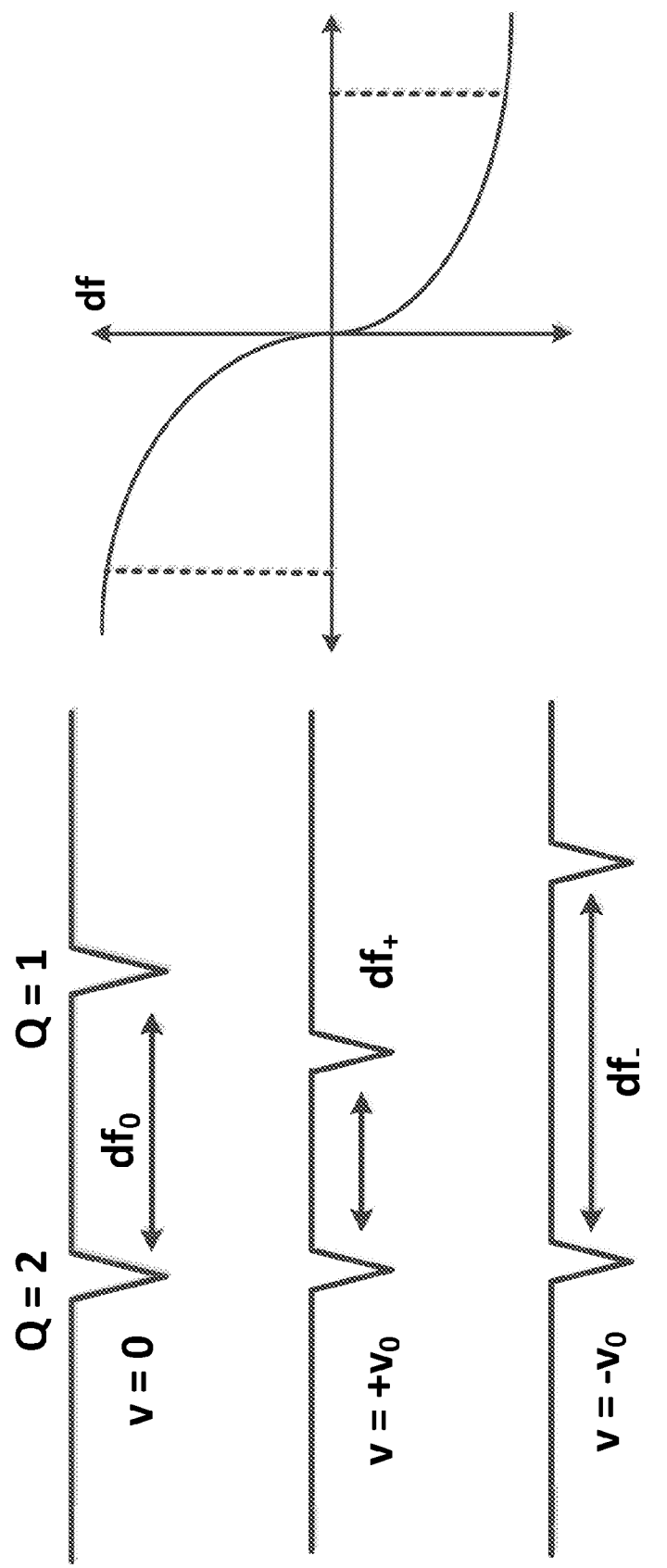
FIGS. 7B and 7C show an operation of the resonator in FIG. 7A.
Figure 7C:
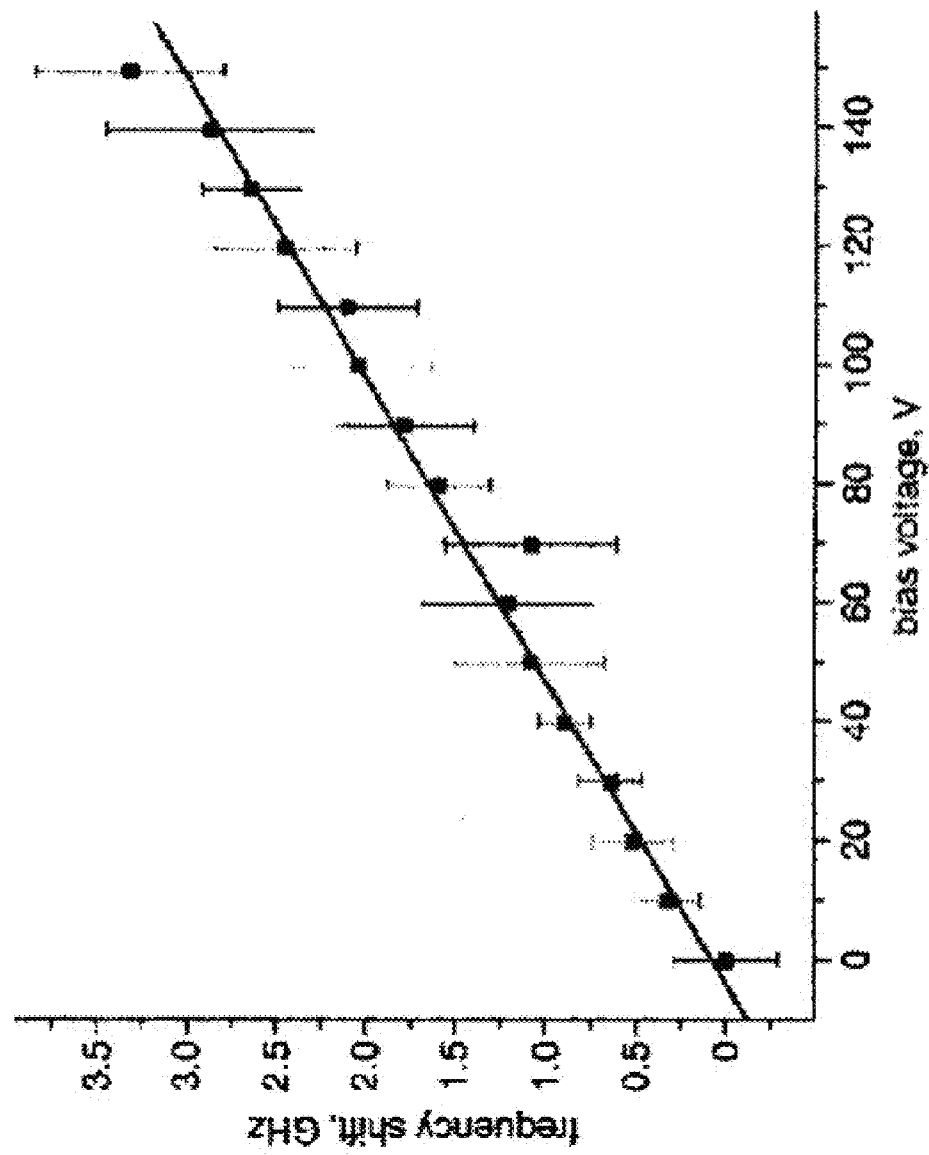

FIG. 7B illustrates the tuning operation of such a disk WGM resonator with concentric poled rings and the respective reconfigurable spectrum showing at three different DC bias voltages. FIG. 7C shows measurements of the radial mode frequency shift of a poled WGM disk resonator based on the design in FIG. 7A where the frequency shift relative to frequencies of other modes is at a rate 21 MHz/V.

Based on the design in FIG. 7A, Sample WGM resonators were constructed by using poled lithium niobate with the concentric ring structure. Performance parameters of these samples were measured: the achieved tuning difference was 21 MHz/V at nominal free spectral range (FSR) of 7 GHz, the maximum linear tuning range achieved was 2 GHz and larger frequency changes were made with nonlinear response to the bias field. The performance of this resonator can be improved by proper placement of the ring domain structure to achieve a tuning rate of about 150 MHz/V, a total tuning range of 15 GHz between +7.5 GHz and −7.5 GHz from zero perturbation. The thickness of the resonator can be reduced, e.g., from 120 microns to 35 microns, to increase the tuning rate, e.g., 300 MHz/V while the tuning range can be increased to 30 GHz between +15 GHz and −15 GHz from zero perturbation.

Notably, the above tunable or reconfigurable WGM resonators with a domain engineered host material structure, e.g., in the configuration shown in FIG. 7A and other configurations, can be used to construct single sideband (SSB) modulators.

Figure 8:
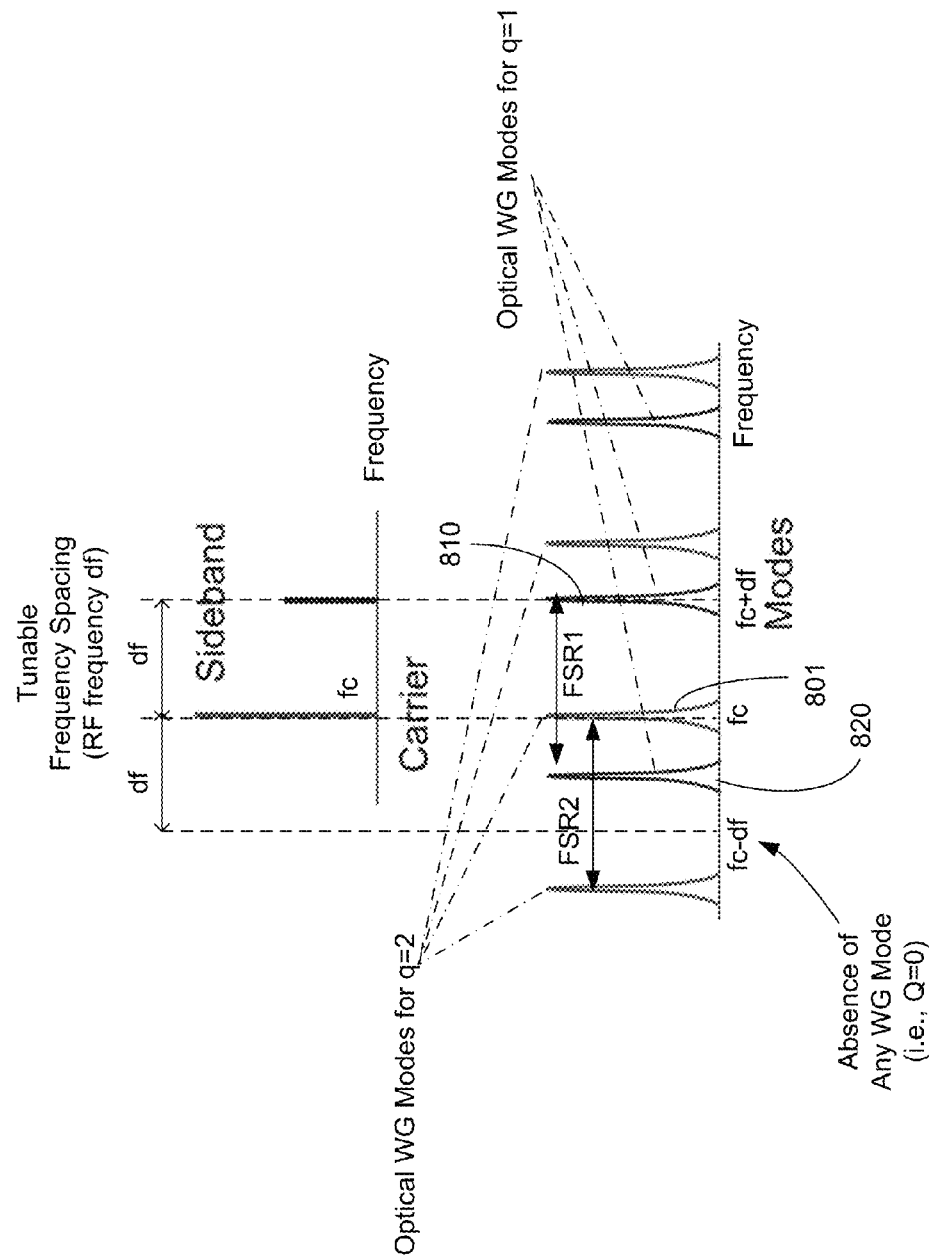
FIG. 8 shows an example of SSB operation in the WGM resonator in FIG. 7A

FIG. 8 illustrates the spectral properties of SSB modulation in a poled electro-optic WGM resonator with concentric rings as shown in FIG. 7A. The upper diagram shows the entire spectrum of the optical output of the electro-optic WGM resonator modulator without any optical filtering, where only a single modulation sideband is generated on one side of the optical carrier fc without the mirror image on the other side of the optical carrier fc. The lower diagram shows two families of WG modes for radial quantum number q at 1 and 2 respectively with their respective free spectral ranges FSR1 and FSR2. In the example illustrated, the poled connected rings are designed so that WG modes for q=1 and FSR1 are shifted in frequency relative to WG modes for q=2 and FSR2 that the two families of WG modes are interleaved in frequency in an asymmetric way with respect to each WG mode. Consider the specific example in FIG. 8, where the mode 801 of the WG modes for q=2 and FSR2 is at the optical carrier frequency fc. In this example, the next WG mode 810 for q=1 and FSR1 on the right hand side of the optical carrier frequency fc is at a frequency of (fc+df) and the next WG mode 820 for q=1 and FSR1 on the left hand side of the optical carrier frequency fc is at a frequency greater than the mirror image frequency of (fc−df) below the optical carrier frequency fc. Notably, given the spectral structure of this example, there is no WG mode at the mirror image frequency of (fc−df) and the quality factor of the resonator at the mirror image frequency is essentially zero. Therefore, when an RF modulation signal at the frequency df is applied to cause optical modulation, only a single sideband (SSB) is generated at (fc+df) and no sideband is generated at (fc−df) on the other side of the optical carrier fc.

Figure 9A:
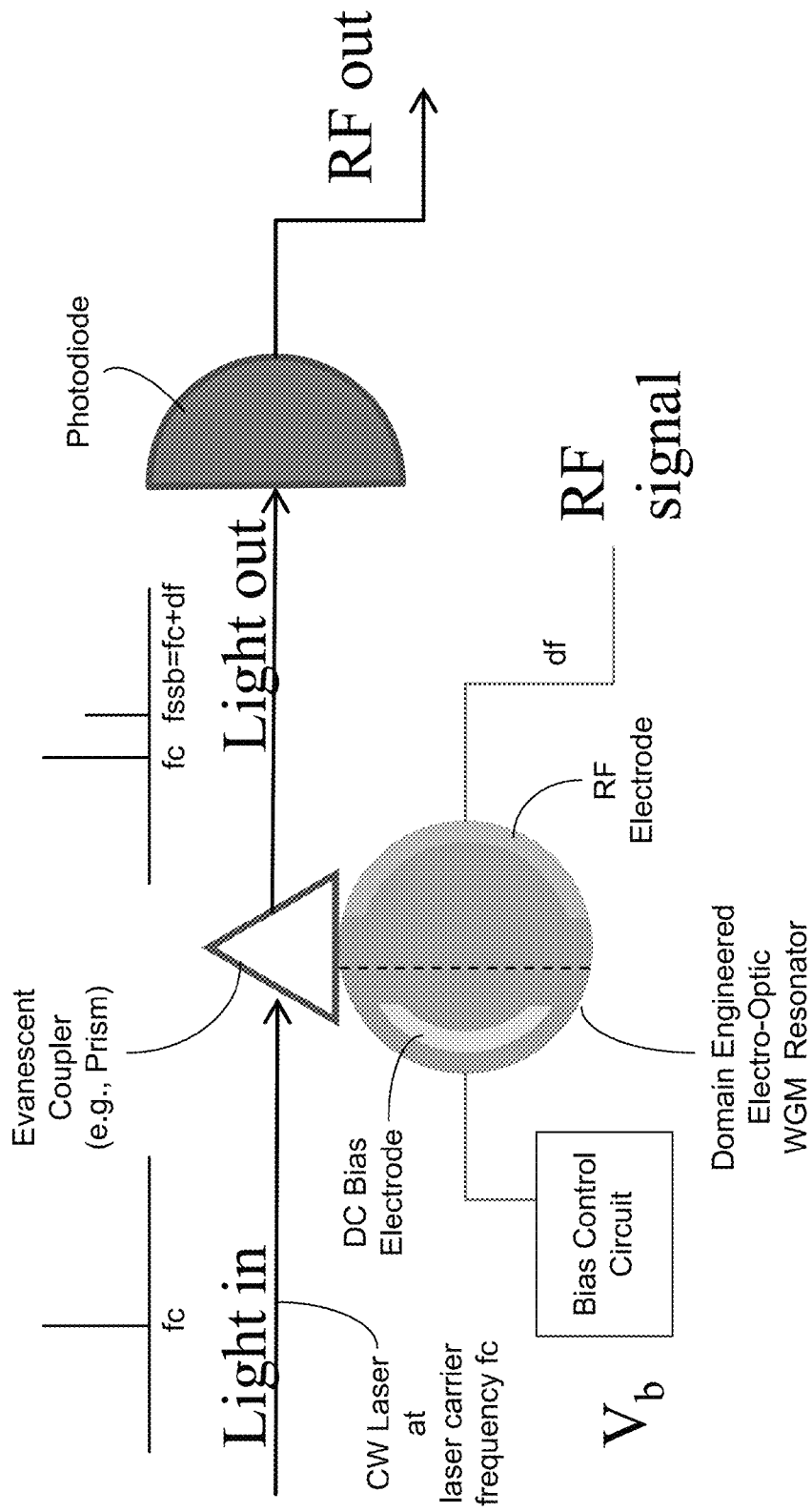
FIGS. 9A, 9B and 9C show examples of devices based on the resonator in FIG. 7A.
Figure 9B:
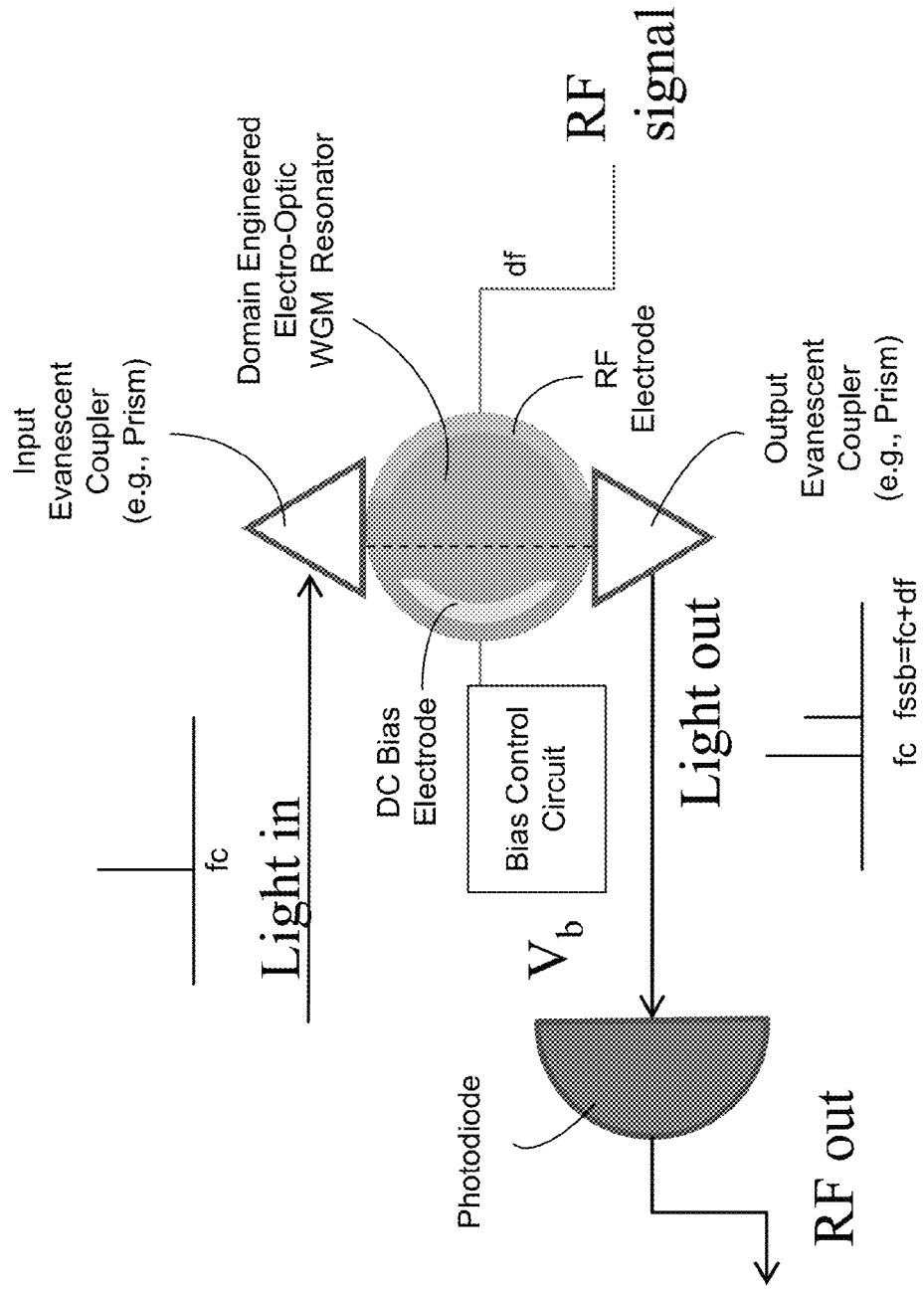

The WGM modes respectively at the optical carrier frequency fc and the frequency of the single sideband (fc+df) in FIG. 8 is separated by a frequency spacing determined by the electro-optic effect in the resonator, e.g., determined by one or combination of various influences that affect the electro-optic effect in the resonator, e.g., resonator shape, temperature, and the bias voltage. The bias voltage is used in the examples below for tuning the SSB modulator. FIGS. 9A and 9B show two examples of such SSB modulators.

FIG. 9A shows an exemplary SSB modulator based on a tunable or reconfigurable WGM resonator with a domain engineered electro-optic material structure. An optical evanescent coupler, e.g. a prism, is used to couple laser light into the WGM resonator and to couple light inside the resonator out of the resonator to produce an optical output signal. The WGM resonator is formed by a domain engineered electro-optic material structure, e.g., the concentric rings with alternating domains with their domain polarizations in +z and −z directions as shown in FIG. 7A. Electrodes are formed on the top and bottom of the WGM resonator and include at least one DC bias electrode through which a DC bias control voltage (Vb) is applied and at least one RF electrode through which an input RF signal at an RF frequency (df) is applied to cause electro-optic modulation inside the domain engineered electro-optic material structure. A bias control circuit is provided and is connected to the DC bias electrode to adjust the bias on the DC bias electrode to tune the SSB modulator. The modulated light inside the WGM resonator is coupled out by the same evanescent coupler as the optical output signal that is modulated to carry the RF signal applied to the WGM resonator. A photodetector is used to receive the optical output signal and to produce an RF output representing the RF signal applied to the WGM resonator.

Considering the concentric ring structure in FIG. 7A as the domain engineered electro-optic material structure for the WGM resonator in FIG. 9A, The CW laser light at the laser carrier frequency fc from a laser is coupled to the reconfigurable WGM resonator into a WGM mode with a mode parameter q=2. The DC bias electrode is to receive a dc-to low frequency signal to apply it to the domain engineered region of the resonator. This sets the frequency difference plus-or-minus-df between mode q=2 and a different mode q=1. The RF electrode placed upon the domain engineered region is connected to a source (e.g., a signal generator or RF receiver terminal or an RF antenna) oscillating at the RF frequency df. The second order nonlinear interaction of the populated q=2 mode and the rf field populates the q=1 mode. The resonator spectrum is designed such that there is no mode at the image frequency which is the frequency of the q=2 mode minus-or-plus-df. Thus, only a single sideband (SSB) is produced by the modulation and is at a frequency fssb of (fc+df). For the rf-pickup, the light reflected from the prism-resonator interface is incident upon the photodetector which is configured to have the appropriate bandwidth for the RF detection.

In other implementations, the input CW laser light at fc can be coupled into the WGM resonator in the q=1 mode. In this case, the second order nonlinear mixing of the rf input with the populated q=1 mode populates the appropriately tuned q=2 mode.

In FIG. 9A, a single evanescent coupler (e.g., prism) is used to provide both input and output optical coupling operations. This optical coupling mode is a reflection mode which couples modulated light that counter propagates with the light coupled into the resonator out of the resonator. FIG. 9B shows another SSB modulator where an input evanescent coupler is used for coupling input CW laser light into the WGM resonator and a separate output evanescent coupler is used to couple modulated light in the WGM resonator output of the WGM resonator as the output. This optical coupling mode is a transmission mode in which the modulated light in the same WGM resonator mode in the same direction of the light coupled into the WGM resonator by the input coupler is coupled out by the output coupler into the external optical circuit.

The above process of first using the RF signal to cause optical modulation and then converting modulated light back into RF provides the basis for forming various devices, such as optical modulators, RF receivers and RF filters. The device in FIG. 9A can be structured as an optical receiver where the RF electrode is coupled to an RF receiving terminal such as an RF antenna to receive the input RF signal. The DC bias Vb can be used to adjust the DC bias to tune the optical resonance of the WGM resonator so that the RF energy at a specific RF frequency within the input RF signal is to be recovered at the RF output of the photodetector. Tuning the DC bias voltage Vb provides a tuning mechanism for tuning the RF receiver. The WGM resonator can be configured as a high Q cavity with a narrow optical bandwidth for a WGM resonator mode. This narrow optical bandwidth can be used to perform signal filtering in the optical domain on the input RF signal to select one or more RF signal components in the input RF signal. The optical filtered signal is the output of the WGM resonator which is then converted back into the RF domain at the photodetector as the filtered RF output. This optical filtering of RF signals is tunable by adjusting the DC bias voltage Vb applied to the WGM resonator to tune the resonance of one or more WGM modes.

Figure 9C:
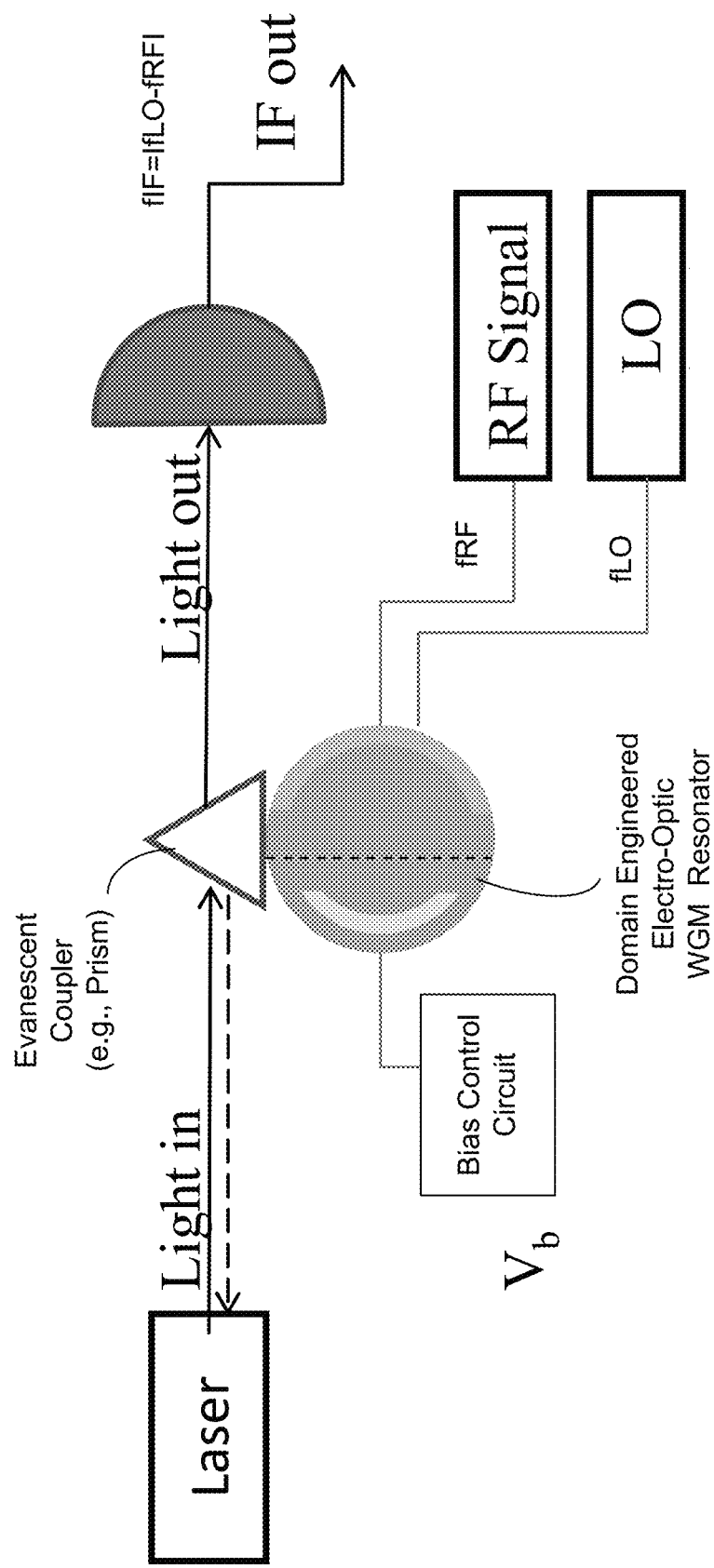

FIG. 9C shows a tunable photonic RF receiver using a single side band modulator based on a domain engineered whispering gallery mode resonator. A tunable laser, such as diode laser, is used to generate the seed CW laser light which is coupled into the WGM resonator by using a prism or another evanescent optical coupling technique. The laser light coupled into the WGM resonator creates a counter-propagating laser light in one or more WGM modes. The same evanescent coupler can be used to couple this counter-propagating light out of the WGM resonator and directs this light back to the laser to cause injection locking of the laser so that the laser is locked to the WGM resonator.

For example, the laser can be injection locked to the reconfigurable resonator at the q=2(1) mode. An rf antenna is attached to the rf electrode on the resonator to direct a received RF signal from the antenna to the RF electrode. A local oscillator (LO) is also attached to the rf electrode to apply the LO signal at a LO frequency (fLO) to the WGM resonator. A DC bias electrode for receiving a DC or low frequency voltage signal to apply the DC or low frequency voltage signal to the top of the domain engineered region of the reconfigurable resonator. The second order nonlinear interaction in the WGMR mixes the populated q=2(1) mode with the rf bias to populate light in the q=1(2) mode. The frequency spacing between the q=2 and q=1 mode is determined by the low frequency to dc bias voltage. In this design, both the LO signal and the single sideband signal are carried by the output light of the WGM resonator. The reflection off of the prism is incident upon a photodetector with appropriate bandwidth. The output of the photodetector is the beat note of the LO signal and the single sideband at a frequency equal to the difference between fLO and fRF. Such a tunable receiver can be used various RF receiver applications including single chirp radar applications.

The above tunable SSB modulators based on an electro-optic WGM resonator can be used to form various photonic, RF and microwave devices and systems. One example is photonic RF and microwave receivers in which a received RF or microwave signal is applied to the electro-optic material of the WGM resonator to perform the SSB modulation so that the baseband signal in the received signal is carried by the optical single sideband in the modulated output light of the resonator. This optical single sideband in the modulated output light of the resonator is detected at an optical receiver to recover the baseband signal. Such receivers are tunable by tuning the SSB modulator.

Another example of an application for the tunable SSB modulator is a tunable opto-electronic oscillator (OEO) based on the SSB modulator. An OEO is based on an electro-optic feedback loop that directly converts light energy to spectrally pure RF radiation. The OEO performance does not degrade with RF frequency, and an OEO operating at, e.g., 5 GHz, has the same noise performance as one operating at 60 GHz, assuming the same amplifier noise for the two examples. This is a useful feature for radio over fiber (RoF) applications.

An opto-electronic oscillator (OEO) is an oscillator with a positive feedback loop that has both electronic and optical components. See, e.g., U.S. Pat. Nos. 5,723,856 to Yao and Maleki and 5,777,778 to Yao, which are incorporated by reference as part of the specification of this document. Such an OEO includes an electrically controllable optical modulator and at least one active opto-electronic feedback loop that includes an optical part and an electrical part interconnected by a photodetector. The opto-electronic feedback loop receives the modulated optical output from the modulator and converts it into an electrical signal to control the modulator. The loop produces a desired delay and feeds the electrical signal in phase to the modulator to generate and sustain both optical modulation and electrical oscillation at the modulation frequency of the modulator when the total loop gain of the active opto-electronic loop and any other additional feedback loops exceeds the total loss. OEOs use optical modulation to produce oscillations in frequency spectral ranges that are outside the optical spectrum, such as in RF and microwave frequencies. The generated oscillating signals are tunable in frequencies and can have narrow spectral linewidths and low phase noise in comparison with the signals produced by other RF and microwaves oscillators. Notably, the OEOs are optical and electronic hybrid devices and can be used in various applications.

The examples of OEOs described in this document use a whispering mode gallery mode resonator made of an electro-optic material as the optical modulator for modulating the CW laser light from a laser, to filter the modulated laser light and to provide at least a part of the optical delay in the feedback loop. The electro-optic material supports two mutually orthogonal polarizations which may be referred to as the original wave and the extra-ordinary wave, or the TM mode and the TE mode. These two different polarized waves undergo a frequency shift with respect to each other in the electro-optic WGM resonator modulator and proper control of the polarization in OEO feedback loop can be used to produce one modulation sideband in the detector output of an optical detector that interconnects the electrical portion and the optical portion of the feedback loop. Therefore, a single sideband (SSB) modulation can be achieved in the OEO and provide a flexible operating frequency range that is not limited by the FSR of the WGM resonator.

Figure 10A:
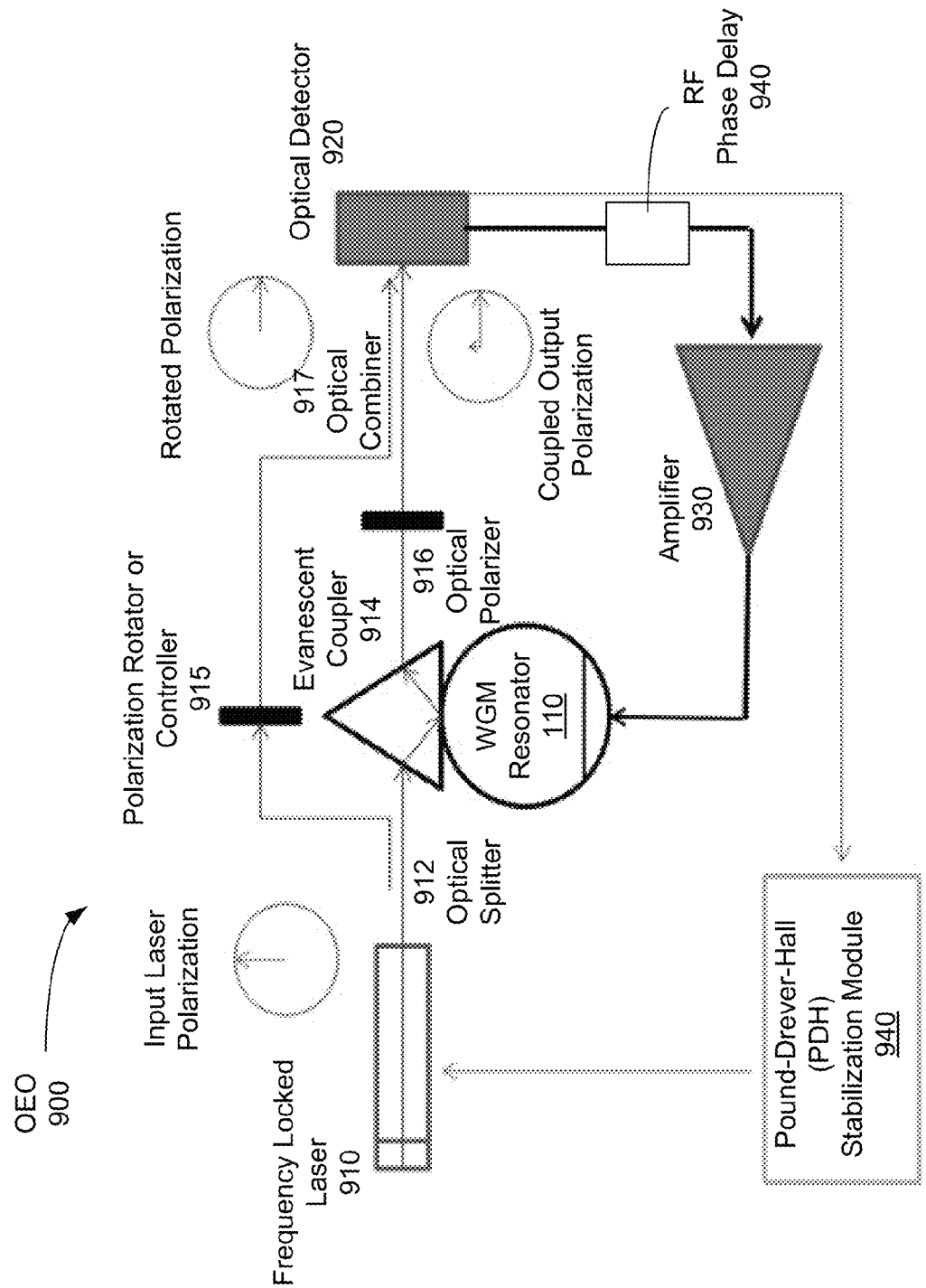
FIGS. 10A and 10B show examples of opto-electronic oscillators based on tunable SSB WGM resonator modulators.
Figure 10B:
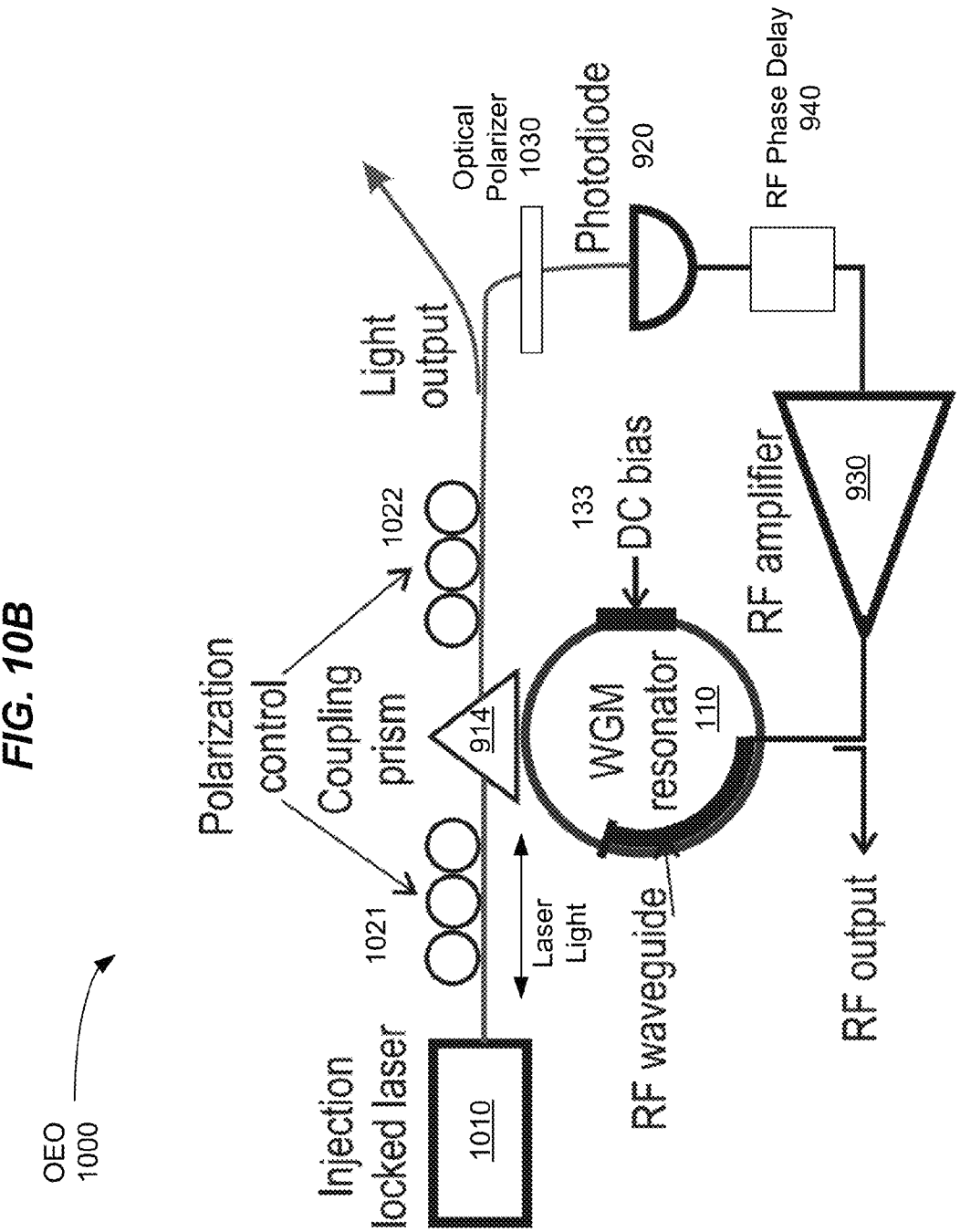

FIGS. 10A and 10B show two OEO examples that use tunable SSB modulation with a compressed carrier (i.e. frequency shifter) to provide a tunable OEO operation using the SSB based on the cross modulation between two polarization modes SSB shown in FIGS. 1A-5.

FIG. 10A shows the first example 900 of an OEO based on the cross modulation between two polarization modes in the WGM resonator. This OEO 900 includes a tunable laser 910 that produces a CW laser beam for the OEO 900, a WGM resonator modulator based on the design in FIGS. 1A and 1B with an electro-optic WGM resonator 110, an evanescent coupler 914 for coupling light into the WGM resonator 110 for optical modulation, delay and filtering and coupling modulated light out of the WGM resonator 110, and an optical detector 920 for interfacing the optical and electrical portions of the OEO feedback loop. An optional amplifier 930 may be coupled in the electrical portion of the OEO loop to amplify the output signal from the detector 920. A phase delay control module can be implemented in the OEO loop to adjust the phase delay of the loop for tuning the OEO. For example, an RF phase delay 940 can be inserted in the electrical portion of the OEO loop to provide this phase delay adjustment. A variable optical delay element can also be inserted into the optical portion of the OEO loop to provide this control. A combination of the optical delay control and the RF delay control may be implemented.

The laser 910 is linearly polarized and is split into two laser beams along two optical paths by an optical splitter 912 located between the laser 910 and the evanescent coupler 914. The first optical path includes a polarization rotator or a polarization controller 915 which rotates the optical polarization of the first laser beam that is not modulated by 90 degrees. The second optical path leads to the evanescent coupler 914 and the WGM resonator modulator, and an optical polarizer 914 that transmits light in a polarization orthogonal to the input laser polarization and rejects light in the input laser polarization. An optical combiner 917 is provided to combine light in the first and second optical paths to produce a combined output beam to the optical detector 920. The beat between the two beams at the combiner 916 is detected by the detector 920 and is converted to a single sideband (SSB) signal.

The opto-electronic loop of the OEO 900 in FIG. 10A has an optical portion formed by the WGM resonator 110 as an optical delay element, an optical filter and an optical modulator, and an electrical portion which includes the optical detector 920 (e.g., a photodiode), and the electrical feedback path to the electrodes on the resonator 110 (including the amplifier 930). This is a closed loop and can be operated to have a loop gain higher than the loop loss and the feedback to the resonator 110 can be in phase. Under such conditions, the closed loop is a positive feedback loop and will oscillate as an opto-electronic oscillator (OEO) at a frequency at which the light in the resonator 110 is modulated.

The tunable laser 910 is locked in frequency to the mode of the modulator 110 in one of the two orthogonal polarizations, e.g., the extraordinary polarization. This laser locking can be achieved by various techniques. In one example, which is shown in FIG. 10A, a Pound-Drever-Hall (PDH) stabilization module 940 is used to lock the laser 910. Various PDH stabilization implementations are known. In another example, an injection locking based on an optical feedback from the resonator 110 is used without the PDM stabilization module 940. The laser 910 (e.g., a diode laser) can be optically coupled to the WGM resonator 110 via the evanescent coupler 914 that couples light out of the resonator 110 back to the laser 910. This feedback light of the resonator 110 is injected back to the laser 910 to stabilize the laser 910 so that the laser wavelength is locked at the wavelength of the WGM mode in the resonator 110 and to reduce the linewidth of the laser 910. One way to achieve this injection locking is described in U.S. patent application Ser. No. 12/139,449 entitled "TUNABLE LASERS LOCKED TO WHISPERING GALLERY MODE RESONATORS" and filed on Jun. 13, 2008, which is incorporated by reference as part of the specification of this application.

The WGM resonator 110 supports two WGM polarization modes: the ordinary wave and the extra-ordinary wave. The evanescent coupler 914 (e.g., a prism coupler) can optically couple light in both modes. The optical polarizer 916 can be oriented to select one of the modulated light in the two modes for the optical detection and conversion at the optical detector 920. As an example, the optical polarizer 916 can be used to suppress the ordinary emission in the output allowing only the signal of the extra-ordinary wave to be directed to the optical detector. Output of extraordinary polarization is mixed coherently by aligning polarization in the other optical path with small portion of initial laser's power to produce AM microwave signal at detector 920. The detector output is fed back to the modulator 110. In this scheme oscillations of a fixed frequency at FSR of extraordinary polarization are suppressed because of polarized output and the OEO oscillator operates at the tunable differential ordinary-extraordinary frequency.

Various polarization selective elements for output coupling may be implemented for the OEO 900 in FIG. 10A. For example, a prism-based output coupler with a polarizer can be used as shown in FIG. 9. In another example, a probe prism of a high refractive index (e.g., a Ge prism) can be used and, due to boundary conditions, this prism couples out extraordinary polarization more efficiently than ordinary one. As a result in OEO pumped with ordinary polarization oscillations at fixed FSR can be suppressed. In yet another example, an optical detector can be attached to the rim of the resonator 110 through a transparent spacer. The ordinary polarization has an index (n2) higher than that of the evanescent field which allows simple and compact suppression of the fixed frequency oscillation.

Hence, based on the above example, it is possible to achieve multiple functions in a tunable OEO: optical modulation of light, optical filtering, optical delay and optical tuning of the frequency, with a single WGM resonator made with an electro-optic crystal. WGM resonators are axio-symmetric dielectric structures that support modes with very high quality factors (e.g., $2\times10^9$). Such WGM resonators can be configured so that sidebands on the optical carrier at the RF frequency are generated at the output when an optical mode is excited with the pump laser light and a RF signal with a frequency corresponding to the free spectral range (FSR) of the resonator are simultaneously applied. This scheme is used to realize an efficient EOM. Such a modulator can improve the OEO properties. An efficient OEO calls for the intrinsically amplitude modulation. The WGM-based electro-optic modulation (EOM) scheme by constructing a structure that produces single sideband modulation (SSB). Such a modulation has an amplitude counterpart. This can be accomplished by applying the RF field along the radius of a WGM resonator produced from a Zcut lithium niobate preform. Such an RF field couples optical TE and TM mode families of the WGM resonator due to the non-diagonal element $r_{s1}$ of the electro-optic tensor of the material. Because the TE and TM mode families are frequency shifted with respect to each other, only one modulation sideband is generated. By applying a DC voltage to the WGM resonator the modes belonging to different mode families move in frequency, but at different rates. Thus, the mode spacing, and the corresponding modulation frequency given by the mode spacing, can be tuned. This configuration leads to a highly efficient, tunable, narrowband modulator, the three parameters that allow realization of a high performance, tunable OEO.

FIG. 10B shows another OEO example 1000 based on the above cross modulation of two polarization modes in the WGM resonator 110. The semiconductor laser 210 is injection locked to the lithium niobate or tantalate resonator 110 arranged as a SSB modulator. The output of the modulator 110 may be sent to a semiconductor optical amplifier (SOA) before entering a long length of fiber that is directs light to the optical detector 920. The optical detector 920 produces an electric signal that is amplified before being fed back to the modulator 110 to complete the OEO loop. The narrow bandwidth of the resonator 110 provides the filter function for the loop, and the change in the mode spacing produced by the applied DC voltage bias tunes the frequency. Such an oscillator may be tuned from 20 to 35 GHz. The spectral purity goal corresponds to the phase noise of −120 dBc at 100 kHz.

Different from the two optical path design in the OEO 900 shown in FIG. 10A, the OEO 1000 in FIG. 10B implements two polarization controllers 1021 and 1022 to achieve the cross modulation of the two polarization modes in the resonator 110. The first polarization controller 1021 is placed in the optical path (e.g., the fiber) between the laser 1010 and the evanescent coupler 914 to place the polarization of the laser light at 45 degrees with respect to either one of the two orthogonal polarizations in the resonator 110. Under this input polarization configuration, one half of the input laser light is coupled into the WGM resonator and the remaining one half is reflected, without entering into the resonator 110, to pass through the evanescent prism coupler 914 into the output optical path to the optical detector 920. The one half of the laser light coupled into the resonator 110 is modulated and filtered and is then coupled out by the coupler 914 to overlap with the reflected laser input light. The combined light is then directed into the detector 920.

Notably, the SSB modulator operates based on coupling of TE and TM modes and the SSB signal is orthogonally polarized to the pump light that is used to pump the WGM resonator 110. An optical polarizer 1030 can be inserted in front of the detector 920 to reject the light at the optical carrier frequency of the pump light and to transmit light in the orthogonal polarization which is the SSB signal. This polarization-selective detection can increase the signal suppression of the OEO and improves the stability and performance of the OEO.

Based on above, in one aspect, an OEO can be constructed to include a laser that is tunable and produces a laser beam at a laser frequency; an optical resonator exhibiting an electro-optic effect and structured to support whispering gallery modes circulating in the optical resonator in two mutually orthogonal polarizations and being optically coupled to the laser to receive a portion of the laser beam into the optical resonator; a laser locking mechanism to lock the laser frequency with respect to a whispering gallery mode resonance of the optical resonator; an evanescent optical coupler that evanescently couples the laser beam into the optical resonator and evanescently couples the light inside the optical resonator out of the optical resonator to produce resonator output light; electrodes formed on the optical resonator to apply a modulation control signal to effectuate an optical modulation of light based on the electro-optic effect; an optical detector to receive a portion of light from the laser that does not enter the optical resonator and at least a portion of the resonator output light; a polarization control mechanism to control polarizations of the portion of light from the laser that does not enter the optical resonator and the portion of the resonator output light to allow light in the two mutually orthogonal polarizations to interfere at the optical detector to produce a single modulation sideband corresponding to one of the two mutually orthogonal polarizations; and a feedback circuit coupled between the optical detector and the electrodes to receive a detector output from the optical detector and to produce the modulation control signal at a tunable modulation frequency.

In another aspect, an OEO can include a laser that is tunable and produces a laser beam at a laser frequency; and an electrically controllable optical modulator to receive the laser beam and to modulate the laser beam to produce a modulated laser beam. The optical modulator includes an optical resonator exhibiting an electro-optic effect and structured to support whispering gallery modes circulating in the optical resonator in two mutually orthogonal polarizations and being optically coupled to the laser to receive a portion of the laser beam into the optical resonator, and electrodes formed on the optical resonator to apply a modulation control signal to effectuate an optical modulation of light based on the electro-optic effect. This photonic device also includes an active opto-electronic feedback loop that comprises an optical part coupled to the optical resonator to receive the modulated laser beam and an electrical part that produces the modulation control signal, and an optical detector coupled between the optical part and the electrical part and the opto-electronic feedback loop feeds the modulation control signal in phase to the electrodes on the optical resonator to generate and sustain both optical modulation and electrical oscillation at the modulation frequency of the modulator. A polarization control mechanism is provided in this photonic device to control polarization of light received at the optical detector to allow light in the two mutually orthogonal polarizations to interfere at the optical detector to produce a single modulation sideband so that a modulation frequency of the modulator at a difference between frequencies of whispering gallery modes at the two mutually orthogonal polarizations inside the optical resonator.

Figure 11:
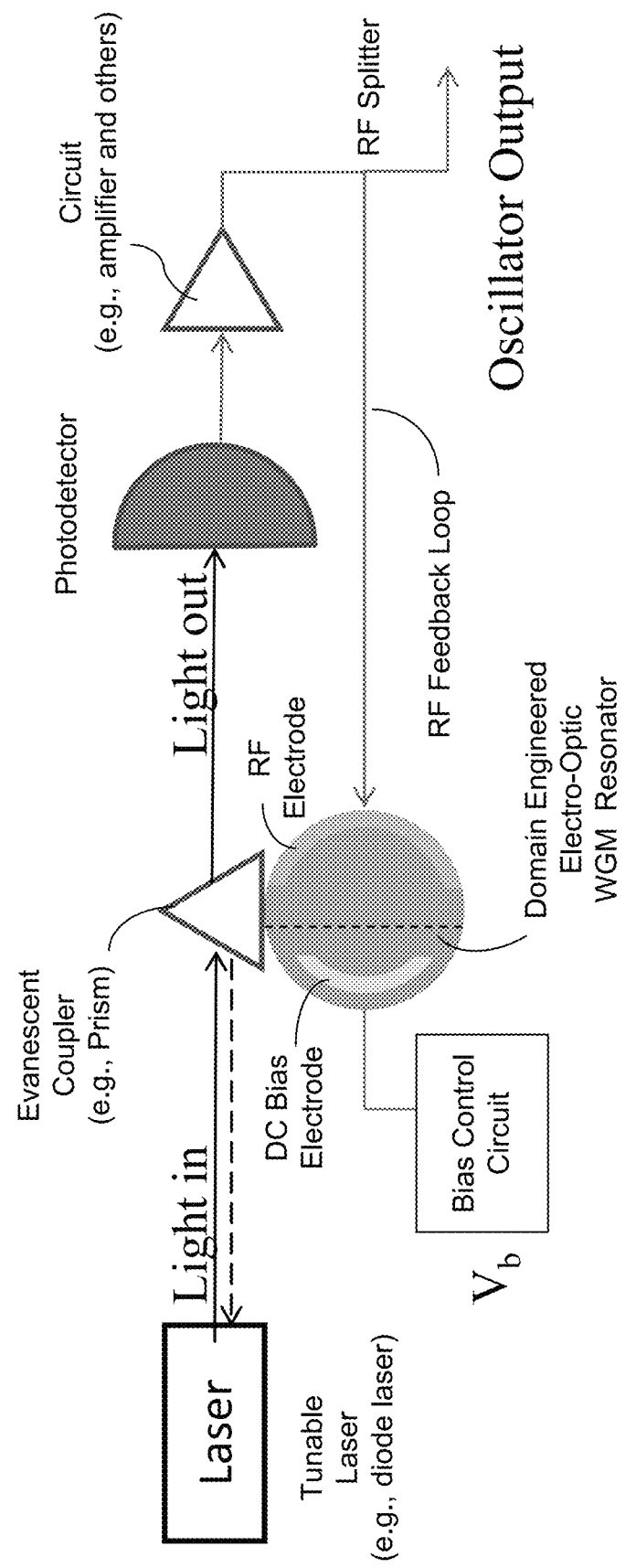
FIG. 11 shows an example of an opto-electronic oscillator based on the resonator in FIG. 7A.

FIG. 11 shows a tunable OEO based on the SSB modulator using a domain engineered electro-optic WGM resonator such as the concentric ring structure in FIG. 7A. The tunable laser (e.g., a diode laser) is injection locked to the WGM resonator of the single sideband modulator. The reflected light from the prism is incident upon a photodetector. The output of the photodetector is directed into a circuit which includes an amplifier and other circuit components such as an RF filter and RF phase delay line. The output of the photodetector is amplified and conditioned (e.g., filtered) to produce a feedback control signal. This feedback control signal is returned to the RF electrode on the resonator. An RF splitter can be coupled to the circuit to split the feedback control signal into an OEO output signal and the feedback control. The low-frequency-to-dc bias voltage determines the oscillation frequency. The bias control circuit is used to adjust the bias on the DC bias electrode to tune the oscillation frequency.

More specifically, the OEO in FIG. 11 has an electrically controllable optical modulator to receive the laser beam and to modulate the laser beam to produce a modulated laser beam. The optical modulator includes the WGM resonator that is formed of different poled electro-optic domains and is structured to support whispering gallery modes circulating in the optical resonator to effectuate a single sideband (SSB) on only one side of the laser frequency without having a mirror image sideband on the other side of the laser frequency. The optical resonator is optically coupled to the laser to receive a portion of the laser beam into the optical resonator. The OEO includes electrodes formed on the optical resonator to apply a modulation control signal to effectuate an optical modulation of light based on the electro-optic effect in the poled electro-optic domains. The OEO includes an opto-electronic feedback loop that includes an optical part coupled to the optical resonator to receive the modulated laser beam and an electrical part (e.g., the circuit shown in FIG. 11) that produces the modulation control signal, and an optical detector coupled between the optical part and the electrical part. The opto-electronic feedback loop feeds the modulation control signal in phase to the electrodes on the optical resonator to generate and sustain both optical modulation and electrical oscillation at the modulation frequency of the modulator.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations, modifications and enhancements of the disclosed implementations and other implementations can be made based on what is described and illustrated in this document.

What is claimed is:

1. A device based on a whispering gallery mode optical resonator, comprising:

a laser that produces continuous wave (CW) laser light at a laser frequency;

an optical resonator structured to include different poled electro-optic domains and to support whispering gallery modes circulating in the optical resonator to effectuate a single sideband (SSB) on only one side of the laser frequency without having a mirror image sideband on the other side of the laser frequency;

an evanescent optical coupler located to couple the laser light from the laser into the optical resonator;

electrodes formed on the optical resonator to include at least one DC bias electrode to receive a DC bias voltage and at lease one RF electrode to receive an RF signal to produce the optical single sideband (SSB); and a bias control circuit coupled to the DC bias electrode to apply and adjust the DC bias voltage to tune a frequency spacing between the optical single sideband and the laser frequency.

2. The device as in claim 1, wherein:

the optical resonator is a disk resonator and different poled electro-optic domains are concentric rings formed in the disk resonator.

3. The device as in claim 1, wherein:

the laser is locked to the optical resonator.

4. The device as in claim 3, wherein:

the laser is locked to the optical resonator via injection locking.

5. The device as in claim 4, comprising:

an optical evanescent coupler optically coupled to the optical resonator to couple the laser light into the optical resonator and to coupling light inside the optical resonator out of the optical resonator to cause the injection locking.

6. The device as in claim 1, comprising:

an RF antenna coupled to the RF electrode, the RF antenna operable to receive the RF signal and to direct the received RF signal to the RF electrode.

7. The device as in claim 6, comprising:

a local oscillator that produces a local oscillator signal at a local oscillator frequency and is coupled to apply the local oscillator signal to the RF electrode; and a photodetector coupled to receive light coupled out of the optical resonator to produce a detector output signal containing an RF signal at a frequency equal to a difference between a frequency of the RF signal and the local oscillator frequency.

8. The device as in claim 1, comprising:

a photodetector coupled to receive light coupled out of the optical resonator to produce a detector output signal; and a feedback circuit that receives the detector output and produces the RF signal, the feedback circuit coupled to the RF electrode to apply the RF signal to the RF electrode in phase to cause oscillation.

9. A method for operating a whispering gallery mode optical resonator, comprising:

operating a laser to produce continuous wave (CW) laser light at a laser frequency;

coupling the laser light into an optical resonator structured to include different poled electro-optic domains and to support whispering gallery modes circulating in the optical resonator to effectuate a single sideband (SSB) on only one side of the laser frequency without having a mirror image sideband on the other side of the laser frequency;

applying an RF signal to the optical resonator to produce the optical single sideband (SSB) in the light within the optical resonator; and applying a DC bias voltage to the optical resonator to adjust the DC bias voltage to tune a frequency spacing between the optical single sideband and the laser frequency.

10. The method ad in claim 9, comprising:
directing light coupled out of the optical resonator into a photodetector to produce a detector output;
using the detector output to produce the RF signal that is applied to the optical resonator to form an oscillation loop to cause oscillation.

11. A device based on a whispering gallery mode optical resonator, comprising:
a laser that produces continuous wave (CW) laser light at a laser frequency;
an optical resonator structured to include different poled electro-optic domains and to support whispering gallery modes circulating in the optical resonator to effectuate a single sideband (SSB) on only one side of the laser frequency without having a mirror image sideband on the other side of the laser frequency;
a laser locking mechanism that locks the laser to the optical resonator;
electrodes formed on the optical resonator to include at least one DC bias electrode to receive a DC bias voltage and at lease one RF electrode to receive a modulation control signal to cause optical modulation in the different poled electro-optic domains to produce the optical single sideband (SSB);
an opto-electronic feedback loop that includes an optical part coupled to the optical resonator to receive modulated laser light coupled out of the optical resonator and an electrical part that produces the modulation control signal, and an optical detector coupled between the optical part and the electrical part, the opto-electronic feedback loop feeding the modulation control signal in phase to the RF electrode on the optical resonator; and
a bias control circuit coupled to the DC bias electrode to apply and adjust the DC bias voltage to tune a frequency spacing between the optical single sideband and the optical frequency.

12. The device as in claim 11, wherein:
the optical resonator is a disk resonator and different poled electro-optic domains are concentric rings formed in the disk resonator.

13. The device as in claim 11, wherein:
the laser is locked to the optical resonator.

14. The device as in claim 13, wherein:
the laser is locked to the optical resonator via injection locking.

15. The device as in claim 14, comprising:
an optical evanescent coupler optically coupled to the optical resonator to couple the laser light into the optical resonator and to coupling light inside the optical resonator out of the optical resonator to cause the injection locking.

16. The device as in claim 11, wherein:
the electrical part includes an amplifier.

* * * * *